United States Patent [19]
Katsuyama et al.

[11] Patent Number: 5,740,304
[45] Date of Patent: Apr. 14, 1998

[54] METHOD AND APPARATUS FOR REPLAYING RECORDING MEDIUM FROM ANY BOOKMARK-SET POSITION THEREON

[75] Inventors: Akira Katsuyama; Shuichi Nagano; Takashi Koya, all of Kanagawa, Japan

[73] Assignee: Sony Corporation, Tokyo, Japan

[21] Appl. No.: 814,456

[22] Filed: Mar. 10, 1997

Related U.S. Application Data

[63] Continuation of Ser. No. 497,414, Jun. 30, 1995, abandoned.

[30] Foreign Application Priority Data

Jul. 4, 1994 [JP] Japan .................. 6-173170

[51] Int. Cl.⁶ ...................... H04N 5/76; H04N 5/92
[52] U.S. Cl. ..................... 386/46; 386/70; 386/125
[58] Field of Search .................... 386/1, 46, 6, 68, 386/125, 126, 83, 69, 70; 369/34; H04J 5/76, 5/92, 5/78, 5/781, 5/782, 5/783

[56] References Cited

U.S. PATENT DOCUMENTS

| | | |
|---|---|---|
| 4,755,978 | 7/1988 | Takizawa et al. |
| 5,123,005 | 6/1992 | Kurosu ................... 369/77.1 |
| 5,195,066 | 3/1993 | Amemiya et al. ........... 369/32 |
| 5,228,021 | 7/1993 | Sato et al. ............... 369/58 |
| 5,371,605 | 12/1994 | Masuda et al. ........... 358/342 |
| 5,438,423 | 8/1995 | Lynch et al. ............. 358/335 |
| 5,463,601 | 10/1995 | Yanagisawa .............. 364/32 |
| 5,469,270 | 11/1995 | Yamamoto ................ 358/335 |

FOREIGN PATENT DOCUMENTS

| | | | |
|---|---|---|---|
| 0265167 A3 | 4/1988 | European Pat. Off. ........ G11B 27/00 |
| 0 389 878 | 10/1990 | European Pat. Off. . |
| 0 453 064 | 10/1991 | European Pat. Off. . |
| 0 453 108 | 10/1991 | European Pat. Off. . |
| 0 479 188 | 4/1992 | European Pat. Off. . |
| 0 479 233 | 4/1992 | European Pat. Off. . |
| 0 497 252 | 8/1992 | European Pat. Off. . |
| 0 569 244 | 11/1993 | European Pat. Off. . |
| 0 569 245 | 11/1993 | European Pat. Off. . |

*Primary Examiner*—Tommy P. Chin
*Assistant Examiner*—Luanne P. Din
*Attorney, Agent, or Firm*—William S. Frommer; Alvin Sinderbrand

[57] ABSTRACT

An apparatus for replaying a disc-shaped recording medium such as a video CD on which first video data into which all of audio data or video information for one frame is compressed as well as second video data into which video information for frames located before and after the frame in question is recorded together with address data, and discrimination data for discriminating between menu data and recorded data is also recorded. The replay apparatus includes a replay section, an input section, a memory and a controller. The replay section loads the disc-shaped recording medium therein and replays the loaded disc-shaped recording medium. The controller, when the input section is operated while the replay section is executing the operation of replaying the disc-shaped recording medium, allows replay start position data to be produced on the basis of at least address data of the recording medium at the time of operating the input section and also allows the produced replay start position data to be stored in the memory together with the discrimination data of the recording medium.

13 Claims, 26 Drawing Sheets

FIG. 1
(RELATED ART)

| physical format | CD-ROM(XA) |
|---|---|
| digital·video | MPEG1 conformation<br><br>pixel dimension (pixel number)/frame frequency :<br><br>352×240/29.97Hz(NTSC)<br><br>352×240/23.976Hz<br><br>352×288/25Hz(PAL)<br><br>data transfer rate :<br><br>maximum 1.152Mbit/sec |
| digital·audio | MPEG1<br><br>sampling frequency : 44.1KHz<br><br>data transfer rate : 224Kbit/sec (track 2 and subsequent tracks)<br>64, 96, 128, 192, 224, 384Kbit/sec (track 1) |
| replay time | maximum 74 minutes |
| pixel number of still picture | standerd level : 352×240(NTSC)<br>352×288(PAL)<br>high-fire level : 704×480(NTSC)<br>704×576(PAL) |
| replay type | normal replay, slow, pause, etc<br>menu replay using playback control |
| video signal output | NTSC/PAL | basic structure of sector
(RELATED ART)

one example of video sector
(RELATED ART)

one example of audio sector
(RELATED ART)

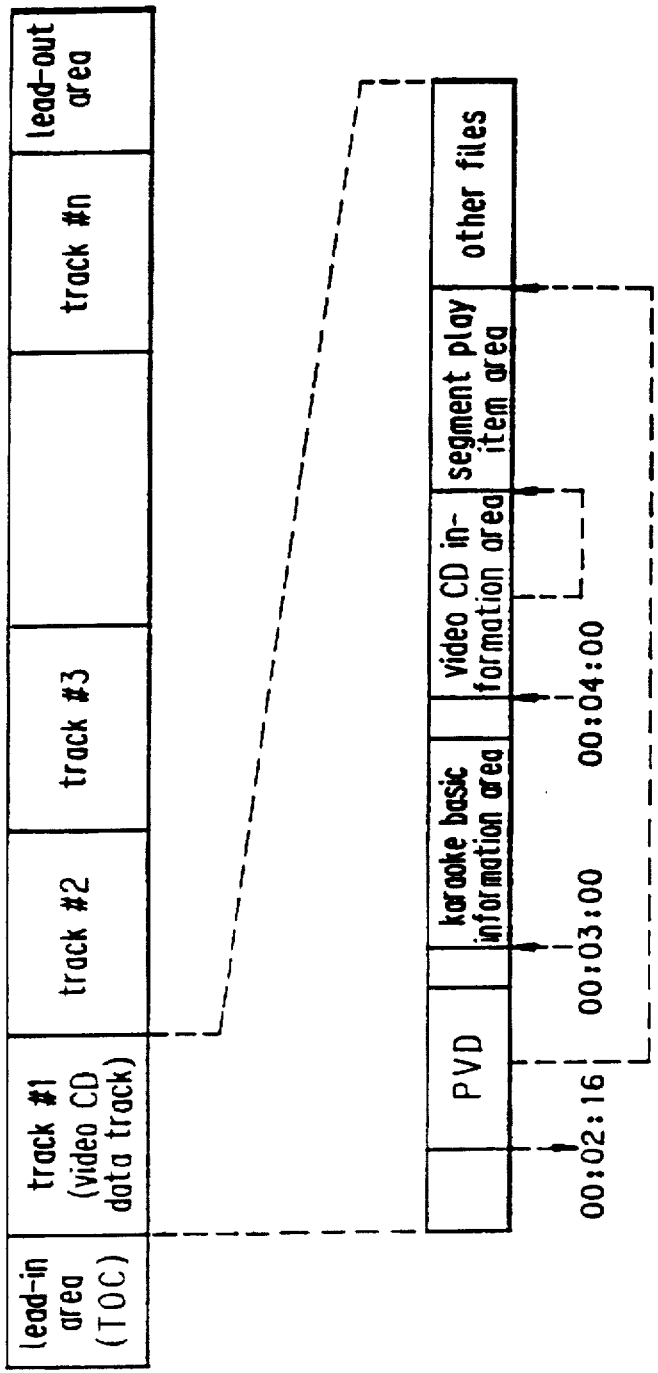

Video CD directory structure (Ver2.0)

FIG. 8
(RELATED ART)
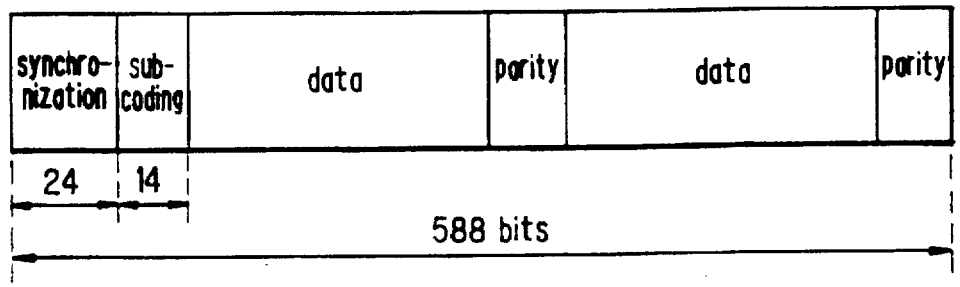
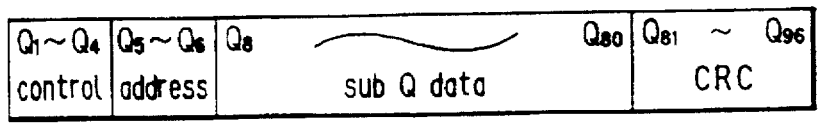
FIG. 9A
(RELATED ART)
FIG. 9B
(RELATED ART)

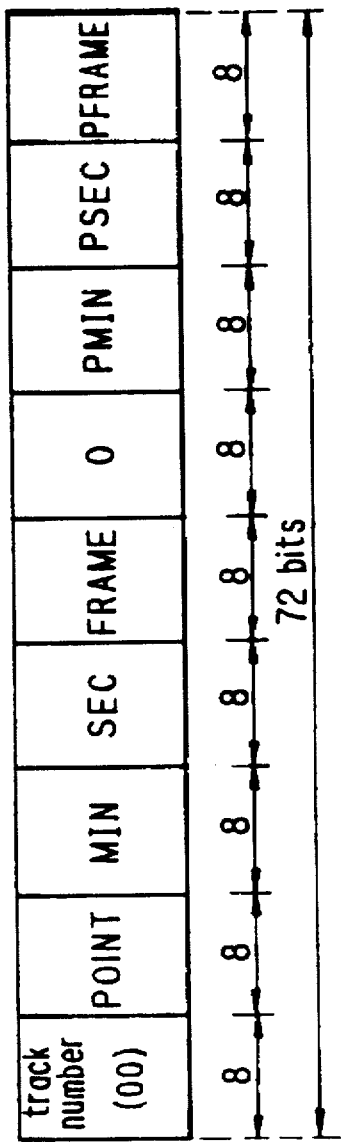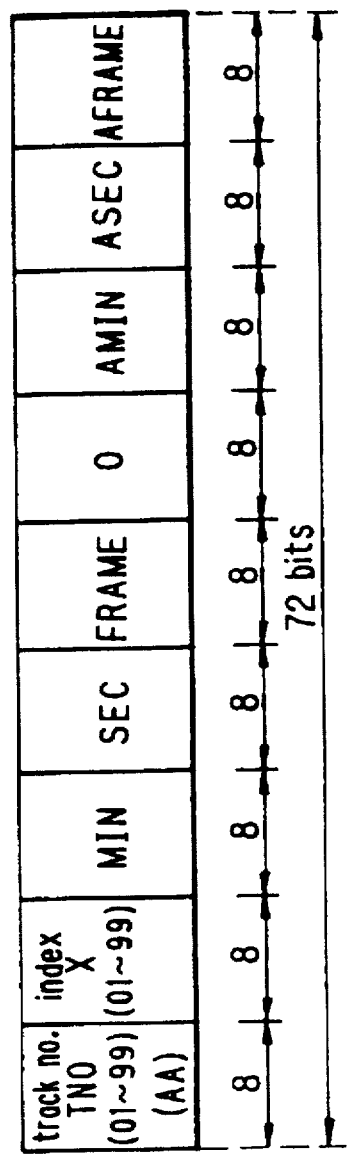
FIG. 10A (RELATED ART)
FIG. 10B (RELATED ART)

FIG. 11
(RELATED ART)

TOC structure (example of 6-track disc)

| TNO | block | POINT | PMIN, PSEC, PFRAME | |
|---|---|---|---|---|
| 00 | n | 01 | 00.02.32 | start point of track #1 |
| | n+1 | 01 | 00.02.32 | |
| | n+2 | 01 | 00.02.32 | |
| | n+3 | 02 | 10.15.12 | start point of track #2 |
| | n+4 | 02 | 10.15.12 | |
| | n+5 | 02 | 10.15.12 | |
| | n+6 | 03 | 16.28.63 | start point of track #3 |
| | n+7 | 03 | 16.28.63 | |
| | n+8 | 03 | 16.28.63 | |
| | n+9 | 04 | . | |
| | n+10 | 04 | . | |
| | n+11 | 04 | . | |
| | n+12 | 05 | . | |
| | n+13 | 05 | . | |
| | n+14 | 05 | . | |
| | n+15 | 06 | 49.10.03 | start point of track #6 |
| | n+16 | 06 | 49.10.03 | |
| | n+17 | 06 | 49.10.03 | |
| | n+18 | A0 | 01.20.00 | track number of first track on disc |
| | n+19 | A0 | 01.20.00 | |
| | n+20 | A0 | 01.20.00 | |
| | n+21 | A1 | 06.00.00 | track number of last track on disc |
| | n+22 | A1 | 06.00.00 | |
| | n+23 | A1 | 06.00.00 | |
| | n+24 | A2 | 52.48.41 | start point of lead-out track |
| | n+25 | A2 | 52.48.41 | |
| 00 | n+26 | A2 | 52.48.41 | |
| 00 | n+27 | 01 | 00.02.32 | repeat |
| | n+28 | 01 | 00.02.32 | |
| | . | . | . | |
| | . | . | . | |
| | . | . | . | |

FIG. 12
(RELATED ART)
PVD (basic volume descriptor) structure

| byte position | byte size | contents |
|---|---|---|
| 2 | 5 | volume structure standard ID |
| 9 | 32 | system recognitor |
| 41 | 32 | volume recognitor |
| 123 | 2 | volume number of album |
| 127 | 2 | album set sequence number |
| 131 | 2 | logic block size |
| 137 | 4 | pass table |
| 141 | 8 | address of pass table |
| 157 | 34 | route directory record |
| 191 | 128 | album recognitor |
| 319 | 128 | publisher recognitor |
| 447 | 128 | author recognitor |
| 575 | 128 | application recognitor |
| 703 | 32 | copywrite file name |
| 740 | 32 | summary file name |
| 777 | 32 | catalogue file name |
| 814 | 16 | manufacture date |
| 831 | 16 | correction date |
| 848 | 16 | expiration date |
| 865 | 16 | effective date |
| 882 | 1 | file structure standard version number |
| 1025 | 26 | XA label code |

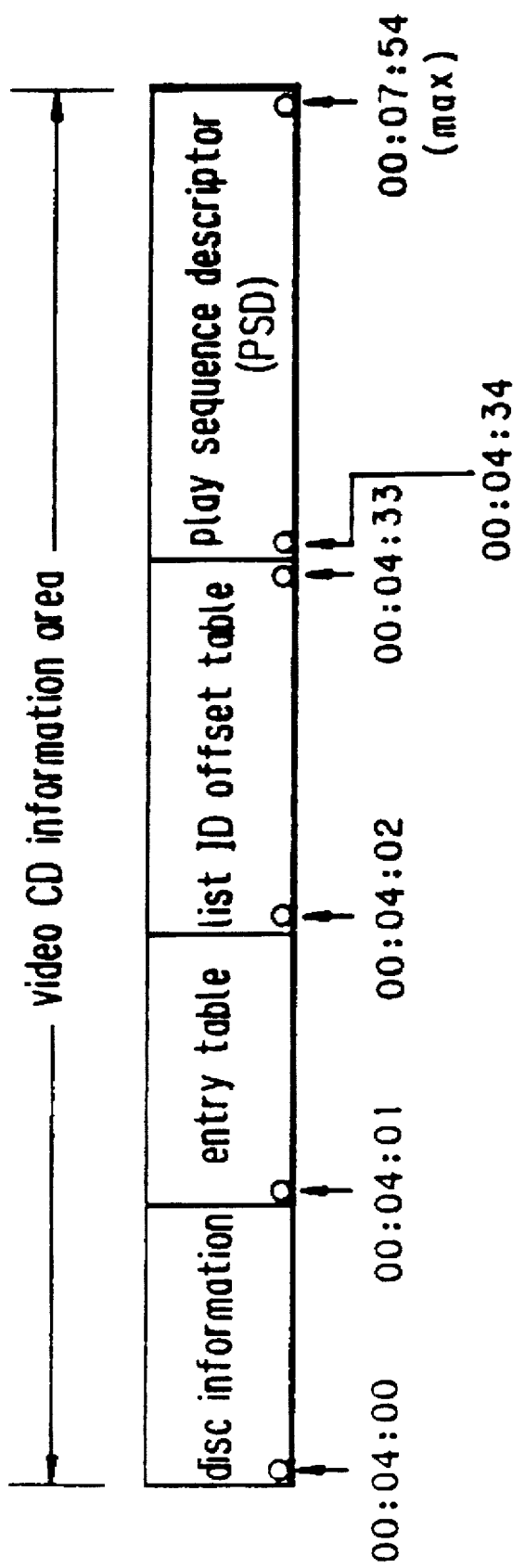

FIG. 14
(RELATED ART)
disc information structure in video CD information area

| byte position | byte size | contents |
|---|---|---|
| 1~8 | 8 | system recognitor |
| 9~10 | 2 | version number |
| 11~26 | 16 | album recognitor |
| 27~28 | 2 | volume number of album |
| 29~30 | 2 | album set sequence number |
| 31~43 | 13 | moving picture track size map |
| 44 | 1 | status flag |
| 45~48 | 4 | PSD size |
| 49~51 | 3 | first segment address |
| 52 | 1 | offset multiplier |
| 53~54 | 2 | List ID number |
| 55~56 | 2 | segment play item number |
| 57~2036 | 1980 | segment play item content table |
| 2037~2048 | 12 | reserved |

FIG. 16
(RELATED ART)
(list ID number = n)

sector address

| | | | |
|---|---|---|---|
| 00:04:02 | start up offset | $0000 | 2 bytes |
| | list ID1 offset | $0000 | 2 bytes |
| | list ID2 offset | $xxxx | 2 bytes |
| | ⋮ | ⋮ | |
| | list IDn offset | $xxxx | 2 bytes |
| | unused list ID | $FFFF | 2 bytes |
| | ⋮ | | |
| 00:04:33 | unused list ID | $FFFF | 2 bytes |

32 sectors

FIG. 17
(RELATED ART)

| | |
|---|---|
| play list header | 1 byte |
| number of item | 1 byte |
| list ID number | 2 bytes |
| previous list offset | 2 bytes |
| next list offset | 2 bytes |
| return list offset | 2 bytes |
| playing time | 2 bytes |
| play item weight time | 1 byte |
| auto pause weight time | 1 byte |
| play item #1 number (PIN#1) | 2 bytes |
| ⋮ | ⋮ |
| play item #N number (PIN#N) | 2 bytes |

FIG. 18 (RELATED ART)
play item number definition

| play item number (PIN) | meaning |
|---|---|
| PIN = 0 or 1 | nothing to be replayed |
| PIN = 2 ~ 99 | replay of track designated by PIN in tracks #2 ~ #99 |
| PIN = 100 ~ 599 | replay starting from entry point designated by (PIN-100) in entry table |
| PIN = 600 ~ 999 | indefinite |
| PIN = 1000 ~ 2979 | replay of segment play item designated by (PIN-999) in segment play items #1 ~ #1980 |
| PIN = 2980 ~ $FFFF | indefinite |

FIG. 19
(RELATED ART)

| | |
|---|---|
| selection list header | 1 byte |
| unused | 1 byte |
| selection branch number (NOS) | 1 byte |
| first number of selection branch (BSN) | 1 byte |
| list ID number | 2 bytes |
| previous list offset | 2 bytes |
| next list offset | 2 bytes |
| return list offset | 2 bytes |
| default list offset | 2 bytes |
| time-out list offset | 2 bytes |
| wait time until time-out | 1 byte |
| loop count and jump timing | 1 byte |
| play item number (PIN) | 2 bytes |
| selection #BSN offset ⋮ selection #(BSN+NOS-1) offset | 2 bytes 2 bytes |

METHOD AND APPARATUS FOR REPLAYING RECORDING MEDIUM FROM ANY BOOKMARK-SET POSITION THEREON

This application is a continuation of application Ser. No. 08/497,414, filed on Jun. 30, 1995, now abandonded.

BACKGROUND OF THE INVENTION

1. Field of the Invention

The present invention relates to an apparatus for replaying a recording medium, and more particularly to an apparatus for replaying a recording medium, which is capable of replaying the recording medium from a predetermined portion thereof using a bookmark set by a user via input keys on the apparatus.

2. Description of the Related Art

A variety of disc media of a so-called read-only type, such as a compact disc (hereinafter referred to as "CD-DA") on which a digital audio signal has been recorded or a video CD, have been spreading. The CD-DA has digital audio data recorded thereon and allows a listener to enjoy music, etc. with a high tone quality. As one type of the CD-DA, there has been also known a CD-G (CD-Graphics) on which still image data can be additionally recorded within sub-code data.

Furthermore, as one type of a so-called CD-ROM, a video CD has been also developed on which audio data as well as moving picture data is recorded.

As a replay apparatus, there has been developed a changer apparatus which is capable of accommodating not only a single disc but also a plurality of discs therein, and of selectively replaying the accommodated discs. Likewise, the changer apparatus of a video CD adaptive type has been developed.

Furthermore, a type of the video CD having a playback control function has been developed.

The video CD of this type is so designed as to be utilized as simple interactive media. For that reason, a directory file is provided which has a hierarchical structure as list data. The list data has a selection list and a play list. The selection list is for branch selection, in which a progress branch to a lower rank list is set to advance through the selection operation of a user.

The play list is for designating a unit of data to be actually replayed, i.e., a track.

With the foregoing lists, while the user makes a selection from the selection list, the progress branch sequentially advances to the lower list. Then, after arrival at a certain play list, the data unit indicated by that play list is replayed.

The user can enjoy the replay of various patterns in an interactive manner with respect to a single disc by utilizing a playback control function based on the list structure.

However, in order to allow a certain data unit to be replayed, there is a case where the selection operation based on the selection list must be executed several times.

For that reason, in the case where the user intends to replay a scene that the user wishes to watch, the troublesome selection operation must be executed several times. Also, the user must keep the selected element in mind. This leads to such a problem that the user is greatly inconvenienced.

SUMMARY OF THE INVENTION

It is therefore an object of the, present invention to provide an apparatus for replaying a recording medium which resolves the above-mentioned problem.

According to the present invention, there is provided an apparatus for replaying a recording medium on which first video data into which all of audio data or video information for one frame is compressed as well as second video data into which video information for frames located before and after the frame in question is recorded together with address data, and discrimination data for discriminating between menu data and recorded data is also recorded. The replay apparatus includes a replay section, an input section, a storage section and a control section. The replay section replays the recording medium. The control section, when the input section is operated while the replay section is executing the operation of replaying the recording medium, allows replay start position data to be produced on the basis of at least address data of the recording medium at the time of operating the input section and also allows the produced replay start position data to be stored in the storage section together with the discrimination data of the recording medium.

Also, according to the present invention, there is provided an apparatus for replaying a recording medium which is capable of replaying a plurality of recording media which are the same in outer configuration and have different data stored. Recorded on the recording medium are data together with address data, and also management data for managing the recorded data as well as discrimination data for discriminating the kind of the recording medium. The replay apparatus includes a replay section, an input section, a storage section and a control section. The replay section is loaded with the recording medium and replays the loaded recording medium. The control section controls the operation of the replay section and storage section on the basis of an output from the input section. The control section, when the input section is operated while the replay section is executing the operation of replaying the recording medium, allows replay start position data to be produced on the basis of at least address data of the recording medium at the time of operating the input section, allows collation data for specifying a recording medium which is replaying to be produced on the basis of at least management data of the recording medium, and also allows the produced replay start position data as well as the produced collation data to be stored in the storage section.

According to the present invention, the replay start position data is replayed on the basis of at least address data of the recording medium, and the produced replay start position data is stored in the memory in accordance with the discrimination data of the recording medium or the collation data produced on the basis of the management data of the recording medium. As a result, the replay start position data intrinsic to the recording medium can be individually stored in the memory, and the stored replay start position data can be read out from the recording medium. Also, the stored replay start position data is read out from the memory, and the replay of the recording medium can be started from a portion designated by the read replay start position data.

BRIEF DESCRIPTION OF THE DRAWINGS

The accompanying drawings, which are incorporated in and constitute a part of this specification, illustrate embodiments of the invention, and together with the description, serve to explain the objects, advantages and principles of the invention. In the drawings, FIG. 1 is an explanatory diagram showing a format of the XA type of a video CD;

FIGS. 6A and 6B are explanatory diagrams showing the structure of the disc of the video CD;

FIG. 8 is an explanatory diagram showing the frame structure of the disc;

FIGS. 9A and 9B are explanatory diagrams showing a sub-code data structure;

FIGS. 10A and 10B are explanatory diagrams showing sub-Q data;

FIG. 11 is an explanatory diagram showing TOC data;

FIG. 12 is an explanatory diagram showing PVD of the video CD;

FIG. 13 is an explanatory diagram showing a video CD information area of the video CD;

FIG. 14 is an explanatory diagram showing disc information of the video CD;

FIG. 16 is an explanatory diagram showing a list ID offset table of the video CD;

FIG. 17 is an explanatory diagram showing a play list of the video CD;

FIG. 18 is an explanatory diagram showing a play item number of the video CD;

FIG. 19 is an explanatory diagram showing a selection list of the video CD;

DETAILED DESCRIPTION OF THE PREFERRED EMBODIMENTS

Hereinafter, a description will be given of an apparatus for replaying a recording medium in accordance with the present invention, with reference to the accompanying drawings.

With respect to an embodiment of the present invention, an example of a replay apparatus which enables the replay of video/audio in the video CD, the CD-DA and the CD-G as a recording medium will be described. As the video CD, there exists a disc to which a playback control function is added.

The description will be made in the order stated below.

[I. Data Structure of Video CD]

1. Data Format
   a. Video Data
   b. Audio Data
   c. Management Data
2. Track Structure
3. Sector Structure
4. Arrangement of Data on Disc
5. TOC and Sub-code
6. Directory Structure
7. Video CD Data Track
   a. PVD (Basic Volume Descriptor)
   b. Video CD Information
      b1—Disc Information
      b2—Entry Table
      b3—List ID Offset Table
      b4—PSD (Play Sequence Descriptor)
         *Play List
         *Selection List
         *End List
   c. Segment Play Item

[II. Playback Control (PBC)]

1. List Structure
2. Embodiment

[III. Structure of a Replay Apparatus]

1. Appearance
2. Circuit Block

[IV. Book Mark Operation]

1. Summary of Book Mark Operation
2. Operation of Registering Book Mark
3. Operation of Replaying Book Mark

[I. Data Structure of Video CD]

1. Data Format

The video CD standard is designed in such a manner that the standardized MPEG (Moving Picture Experts Group) system is applied as a high-efficiency coding technique so that a moving picture and audio of 60 minutes or longer can be replayed from the CD-ROM disc. The video CD has the same outer configuration as a CD-DA and CD-ROM disc. In other words, the outer diameter of the video CD is 12 cm as in the CD-DA and CD-ROM, and the thickness of a substrate of the video CD is 1.2 mm. As a result, the video CD standard is applicable to a domestic software such as music, movie, Karaoke and so on, and also can be used with an educational software, an electronic publication software, a game software and so on in combination with a still picture.

In such video CD, the moving picture data is compressed in the MPEG system, and the moving picture data thus compressed is superimposed on audio data before being recorded on the video CD. Further, management data necessary for the replay is recorded in a predetermined area.

FIG. 1 shows the format of data of a video CD (XA (eXtended Architecture) type).

a. Video Data

Figure 3:
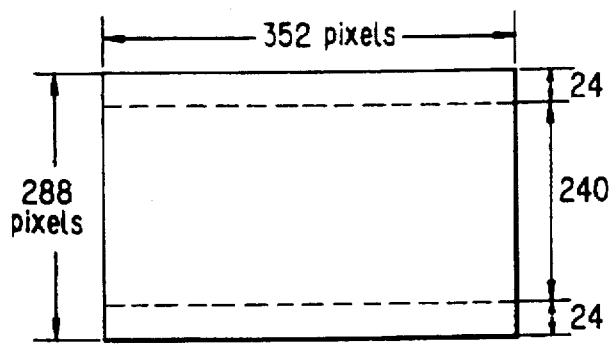
FIG. 3 is an explanatory diagram showing an image size of the video CD.

In the recording format of an image and audio, as is apparent from FIG. 1, 1.152 Mbit/sec are assigned to video data whereas 64 to 384 Kbit/sec are assigned to audio data. The pixel dimensions of video data (moving picture) are 352×240 pixels in the case of an NTSC signal (29.9 Hz) and a film (23.976 Hz), and 52×288 pixels in the case of a PAL signal (25 Hz), as shown in FIG. 3.

The pixel number of a still picture is 352×240 pixels at a standard level and 704×480 pixels at a high resolution level in the case of an NTSC system. It is 352×288 pixels at a standard level and 704×576 pixels at a high-resolution level in the case of a PAL system.

The compression coding of video data (moving picture) through the MPEG system is executed as stated below. If a video signal before compression is from the NTSC system, one second is comprised by video signals of 30 frames in the NTSC system.

In the MPEG system, the respective video signals of one frame are divided into a plurality of blocks (that is, 330 blocks by laterally 22-block division and longitudinally 15-block division) in a direction of a plane. The data of the respective blocks is subjected to DCT (Discrete Cosine Transform), and then re-quantified for further reducing the number of bits (high-band components are set to 0). The blocks are rearranged in the zigzag manner from the left and upper block in one frame, and then subjected to a run-length coding for further compressing the number of bits.

Thus, in the respective frames of the video signals subject to compression, the frames located before and after on the time line are very similar to each other in terms of video information, video information is further compressed by utilizing this fact so that video data of three types in one frame, which are different in the degree of compression, is produced. They are called an i-picture (Intra Picture), a p-picture (Predicated Picture) and a b-picture (Bidirectional Picture).

Figures 2A, 2B, 2C, 2D, 2E:
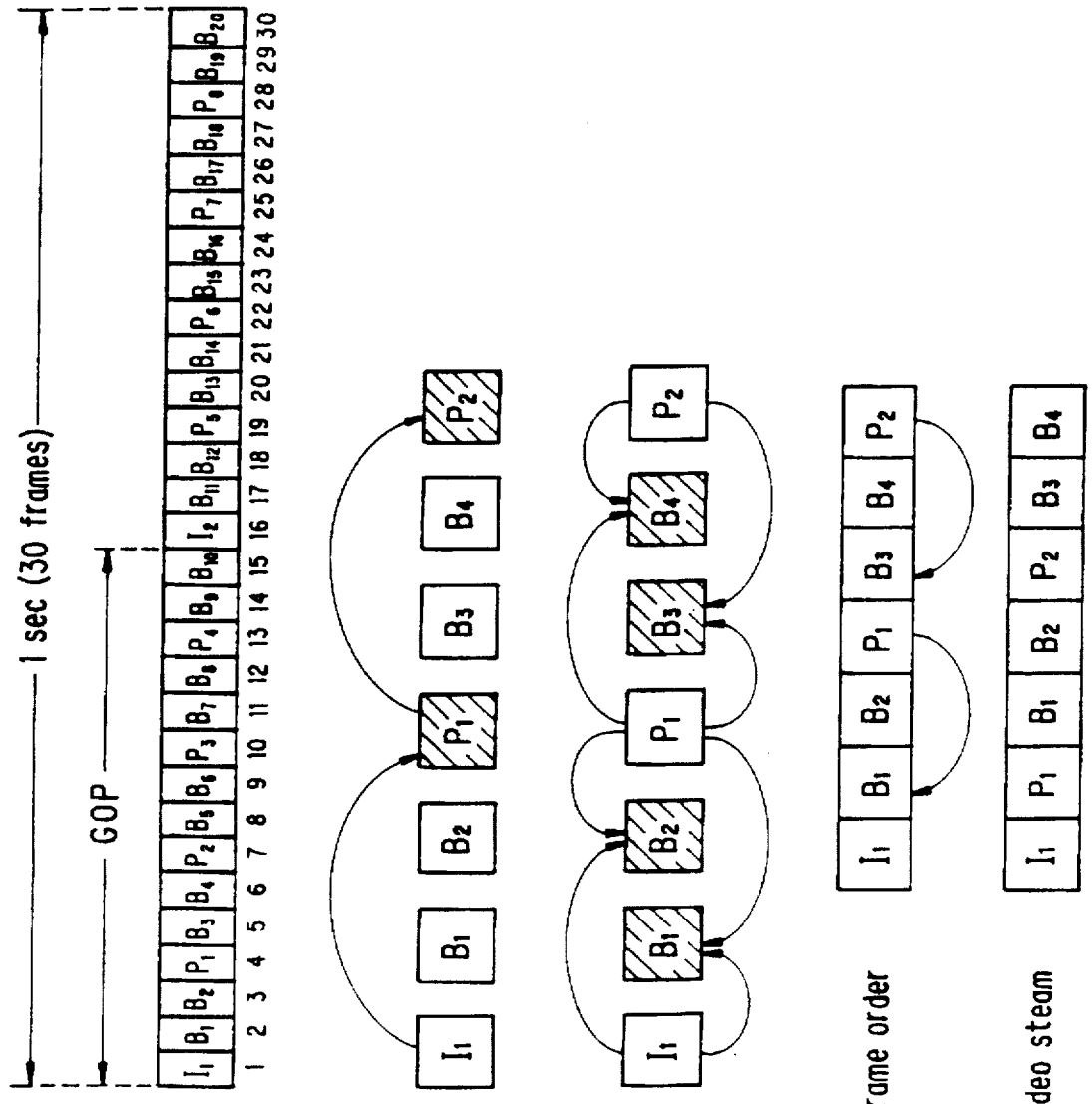
FIGS. 2A to 2E is explanatory diagrams showing video data of the video CD.

In each of 30 frames within one minute, the i-picture, the p-picture and the b-picture are arranged as shown in FIG. 2A. For example, in this case, frames of i-pictures $I_1$ and $I_2$ are disposed at 15-frame intervals and 8 p-pictures $P_1$ to $P_8$ and 20 b-pictures $B_1$ to $B_{20}$ are disposed, respectively, as shown in FIG. 2A. An interval between a certain i-picture and a frame immediately before a succeeding i-picture is called "GOP (Group of Picture)".

The i-picture is normal image data which has been encoded by the DCT conversion as described above.

The p-picture is, as shown in FIG. 2B, produced by encoding the nearest i-picture or p-picture with a movement compensation. For example, the p-picture $P_1$ is produced from the i-picture $I_1$, and the p-picture $P_2$ is produced from the p-picture $P_1$.

For that reason, the p-picture becomes data compressed more than the i-picture. In the case of producing the i-picture or p-picture subsequent to the first i-picture or p-picture, if an error is caused when producing the original i-picture or p-picture, the error is propagated.

The b-picture is produced by using both the past and future i-pictures or p-pictures as shown in FIG. 2C.

For example, the b-pictures $B_1$ and $B_2$ are produced by using the i-picture $I_1$ and the p-picture $P_1$, and the b-pictures $B_3$ and $B_4$ are produced by using the p-picture $P_1$ and the p-picture $P_2$.

The b-picture is data which has been most compressed. Because the b-picture is not referred used for producing data, no error is propagated.

In the algorithm of the MPEG, the selection of a position and synchronization of the i-picture is allowed, and this selection is determined from the such circumstances as the degree of a random access or a scene cut. For example, if an importance is given to the random access, two i-pictures are required for at least one second, as shown in FIG. 2A.

Further, the frequency of the p-picture and the b-pictures can be selected. This is set in accordance with the storage capacity of an encoder or the like.

The encoder in the MPEG system rearranges a video data stream and outputs it, so that the decoder has an excellent efficiency in decoding the encoded data.

For example, in FIG. 2A, a frame order to be displayed (that is, the output order of the decoder) is set as indicated by frame numbers shown in the lower portion of FIG. 2A. In order that the decoder again composes the b-pictures, a p-picture forming a reference is required at a point before the b-picture. For that reason, at the encoder side, the frame order shown in FIG. 2D is rearranged as shown in FIG. 2E, and then transmitted as a video data stream.

b. Audio Data

The audio data format of the MPEG deals with an encoding speed from a wide range of 32 to 448 kbit/sec. In view of the facility of software manufacture and the enhancement of a tone quality, the encoding speed of the moving picture track of a track 2 or the following tracks is set to 224 Kbit/sec.

The sampling frequency is 44.1 KHz as in the CD-DA.

c. Management Data

Management data for conducting a variety of controls for the operation of replaying video data and audio data is recorded on the video CD, in addition to video data and audio data.

In other words, the TOC (Table Of Contents) data and the Sub-code are recorded on the video CD as in the CD-DA, which represents the number of tracks, the start position (absolute time) of each track and so on.

Further, in the video CD, the track 1 is used as a control data track where a variety of management information is recorded. The playback control operation, which will be described later, is also conducted by using data within the control data track.

This management data will be described, respectively, later.

2. Track Structure

Figure 4A:
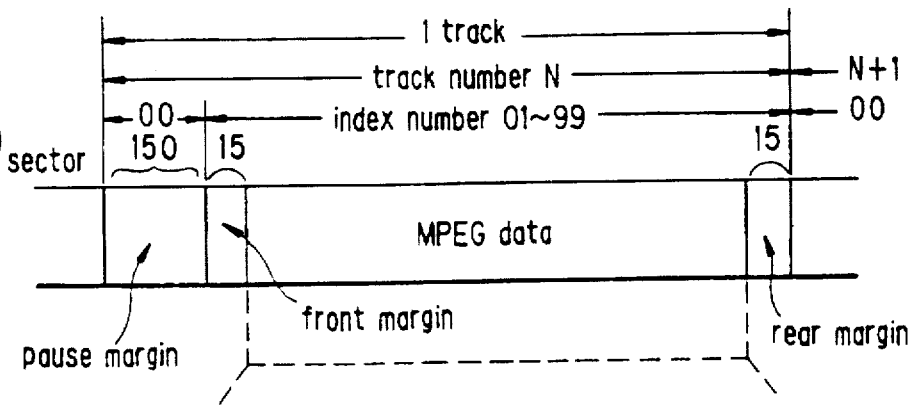
FIGS. 4A and 4B are explanatory diagrams showing the track structure of the video CD.

The data structure of a track on which, for example, video data and audio data which form unit data of one tune are recorded in music or the like is structured as shown in FIG. 4A.

It is assumed that retrieval is made by the track number as in the CD-DA, and a head of one track is provided with a pause margin of 150 sectors.

Further, 15 sectors subsequent to the pause margin is a front margin and the final 15 sectors of the track is a rear margin, both forming empty data areas.

Figure 4B:
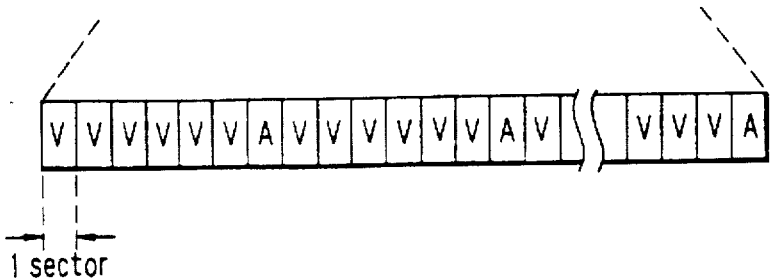

The MPEG data area is formed between the front margin and the rear margin. In the MPEG data area, a sector V forming video data and a sector A forming audio data are time multiplexed through interleaving and recorded at the ratio of 6:1 an average, as shown in FIG. 4B.

3. Sector Structure

Figure 5A:
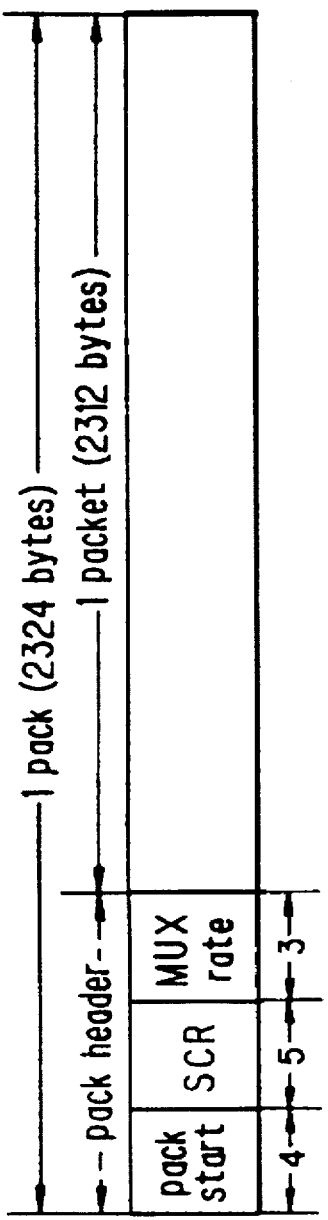
FIGS. 5A to 5C are explanatory diagrams showing examples of the sector structure of the video CD.
Figure 5B:
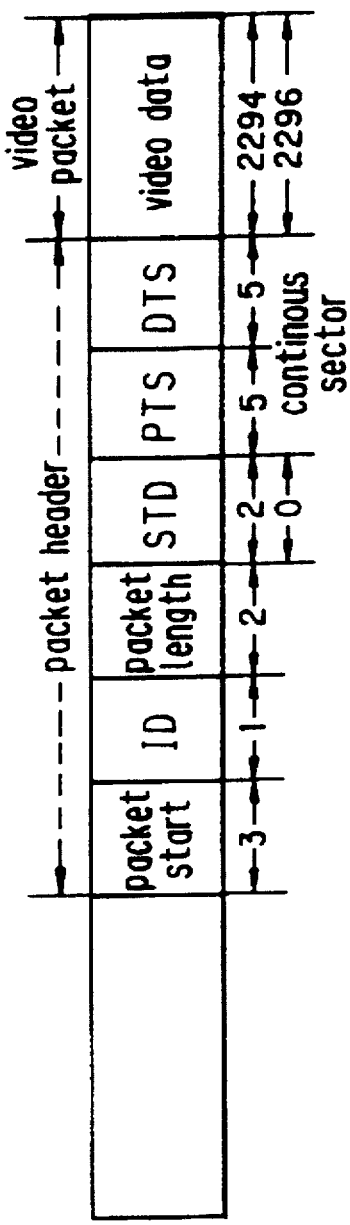
Figure 5C:
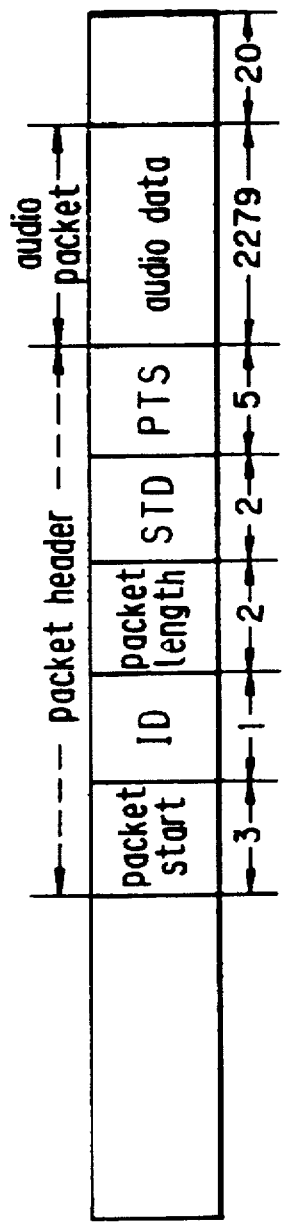

The structure of a sector which forms one data unit within a track is shown in FIGS. 5A to 5C.

FIG. 5A shows a basic structure of the sector. One sector is formed of a pack of 2324 bytes consisting of a pack header and pack data. A pack header of 12 bytes is disposed at the head of the sector, and the remaining 2312 bytes constitute one packet.

In the pack header, a pack start code of 4 bytes is first arranged, a system clock reference (SCR) of 5 bytes is subsequently arranged, and an MUX rate of 3 bytes is finally arranged.

The system clock reference (SCR) is a code which means one sort of absolute time, and a PTS (Presentation Time Stamp: Image Output Start Time) which will be described later is determined with the SCR as a reference.

The SCR is determined as SCR(i)=C+i*1200. Reference symbol i is an index number of a sector within a video data stream and set to be 0 at the top front margin portion. C is a constant which is always 0. 1200 is a value (90000/75= 1200) when the system clock is 90 KHz at 75 Hz sector.

The pack header is disposed in all the V sectors of video data. Such a pack header is arranged in the sector constituted by one pack. However, in the case where a sector is for recording video data, a packet of 2312 bytes subsequent to the pack header is constituted as shown in FIG. 5B.

A packet header of 18 bytes is disposed subsequently to the pack header. The first 3 bytes of the packet header is set as a packet start code. Subsequently, an ID of one byte, a packet length of 2 bytes, an STD (System Target Decoder) of 2 bytes, a PTS of 5 bytes and a DTS (Decoding Time Stamp) of 5 bytes are recorded in the stated order. The PTS which represents an image output start time is set so as to synchronize with audio data. The DTS represents a decoding start time.

A video packet is constituted by 2294 bytes subsequent to the packet header, and actual video data is recorded in the video packet. In other words, as described above, the video data stream of the i-picture, the p-picture and the b-picture is recorded in the video packet.

In the section where the video sectors are continuous, in the first video sector, the video packet is 2294 bytes, but in the subsequent continuous video sectors, the STD is omitted from the packet header with the result that the video packet is extended to 2296 bytes.

In the case where audio data is recorded in the sector, a packet of 2312 bytes subsequent to the pack header is formed as shown in FIG. 5C.

A packet header is disposed subsequent to a pack header as in the video sector. The packet header is constituted by 13 bytes consisting of a packet start code of 3 bytes, an ID of one byte, a packet length of 2 bytes, an STD of 2 bytes and a PTS of 5 bytes.

2279 bytes are assigned to the audio packet so that the compressed digital audio data is recorded in the packet. An empty area of 20 bytes is added at the back of the audio packet to constitute one pack of 2324 bytes (one sector).

The sector is thus constituted formed, and time information for synchronization includes the SCR, the DTS and the PTS. In other words, as shown in FIG. 4B, because video sectors and audio sectors are arranged on one track in time sequence, synchronizing these sectors is necessary. The SCR, the DTS and the PTS are used for conducting this synchronous processing.

In other words, the DTS in each sector represents a time when the decoding of the video packet or audio packet starts with the SCR as a reference clock. Furthermore, the PTS represents a time when a display or audio output is conducted.

Thus, the video sector and the audio sector are synchronized with each other using the above time information.

3. Arrangement of Data on a Disc

The disc structures of the CD-DA and the video CD are shown in FIGS. 6A and 6B, respectively.

In the CD-DA, as shown in FIG. 6A, a lead-in area is arranged on the innermost peripheral side of the disc, on which TOC data is recorded. The TOC data, includes the start positions of the respective tracks, the number of tracks, a musical performance time and so on are recorded in the lead-in area.

Subsequent to the lead-in area, track data is recorded as track #1 to track #n, and a lead-out area is arranged at the outermost peripheral position. On the respective tracks, digital audio data of 16-bit quantization at a sampling rate of 44.1 KHz is recorded together with sub-code data.

On the other hand, the disc structure of the video CD is shown in FIG. 6B.

Substantially as in the CD-DA, the video CD has a lead-in area which is disposed at the innermost peripheral side of the disc, on which TOC data is recorded. Track #1 to track #n are recorded subsequently to the lead-in area, and a lead-out area is arranged at outermost peripheral position.

In the case of the video CD, the track #1 is not used for recording actual video data or audio data as the first track, but used as a control data track.

The actual video data or audio data is recorded on the track #2 to the track #n. In other words, the track #2 to the track #n are constituted formed by the video sector and audio sector described with reference to FIGS. 5A to 5C, as shown in FIGS. 4A to 4B.

Also, in the case of the video CD, a track on which only audio data has been recorded can be provided. In this case, digital audio data of 16-bit quantization at a sampling rate of 44.1 KHz as in the CD-DA is recorded.

Both of the CD-DA and the video CD can provide a maximum of 99 tracks. Therefore, in the case of CD-DA, 99 tunes can be recorded at the maximum. In the video CD, 98 sequences can be recorded at the maximum. The sequence means one sequential section of a moving picture, and for example, in the case where an image such as Karaoke has been recorded, one tune (one track) is one sequence. In the case of a movie, one disc is usually one sequence.

On the control data track using the track #1, as indicated in the lower portion of FIG. 6B, a PVD (basic volume descriptor), a video CD information area., a segment play item area and other files (CD-I(CD-Interactive) application program and so on) are provided. They will be described later.

5. TOC data and Sub-code

In the video CD and the CD-DA, the TOC data recorded in the lead-in area and the sub-code will be described.

The minimum unit of data recorded in the video CD and the CD-DA is one frame. One block includes 98 frames.

The structure of one frame is shown in FIG. 8.

One frame includes 588 bits, and the leading 24 bits are synchronous data, while the subsequent 4 bits are a sub-code data. Then, data and parity are arranged at the back of the sub-code data area.

98 frames thus organized form one block, and sub-code data taken from 98 frames is collected together, thereby forming sub-code data of one block as shown in FIG. 9A.

In the leading first and second frames (frame 98n+1, frame 98n+2) of 98 frames, sub-code data forming a synchronous pattern is recorded. The respective 96-bit channel data, that is, the respective sub-code data of P, Q, R, S, T, U, V and W are formed by the third frame to the 98th frame (frame 98n+3 to frame 98n+98).

Among them, a P-channel and a Q-channel are used for management of access and so on. Here, the P-channel represents only a pause portion between the adjacent tracks, and more fine control is conducted by Q-channels ($Q_1$ to $Q_{96}$). The Q-channel data of 96 bits is formed as shown in FIG. 9B.

First, 4 bits of $Q_1$ to $Q_4$ is control data and used for discriminating the number of channels of audio, an emphasis, a CD-ROM and so on.

In other words, the control data of 4 bits is defined as stated below.

[0***] . . . 2-channel audio
[1***] . . . 4-channel audio
[*0**] . . . CD-DA
[*1**] . . . CD-ROM
[**0*] . . . Digital copy disable
[**1*] . . . Digital copy enable
[***0] . . . No pre-emphasis exists
[***1] . . . Pre-emphasis exists Subsequently, 4 bits of $Q_5$ to $Q_8$ are set as an address, which are control bits of the sub Q-data.

If the address is [0001], the sub Q-data of the subsequent $Q_9$ to $Q_{80}$ is audio Q-data. If the address is [0100], the sub Q-data of the subsequent $Q_9$ to $Q_{80}$ is video Q-data.

Then, $Q_9$ to $Q_{80}$ forms the sub Q delta of 72 bits, and the remaining $Q_{81}$ to $Q_{96}$ form an CRC.

In the lead-in area, the sub Q-data recorded therein forms TOC data.

In other words, the sub Q-data of 72 bits consisting of $Q_9$ to $Q_{80}$ in the Q-channel data read from the lead-in area has information shown in FIG. 10A. The sub Q-data is divided into 8 bits groups.

First, a track number is recorded in the lead-in area. The track number is fixed to [00] in the lead-in area.

Subsequently, POINT is written, and MIN (minute), SEC (second) and FRAME (frame number) are further indicated as the elapsed time within a track.

Moreover, PMIN, PSEC and PFRAME are recorded. The meanings of PMIN, PSEC and PFRAME are determined in accordance with the value of POINT.

When the value of POINT is [01] to [99], that number means a track number. In this case, in PMIN, PSEC and PFRAME, the start point (absolute time address) of a track of the track number is recorded as minute (PMIN), second (PSEC) and frame number (PFRAME).

When the value of POINT is [AO], the track number of a first track is recorded in PMIN. Also, CD-DA, CD-I and CD-ROM (XA type) are discriminated by the value of PSEC.

When the value of POINT is [A1], the track number of a final track is recorded in PMIN.

When the value of POINT is [A2], the start point of the lead-out area is indicated as an absolute time address in PMIN, PSEC and PFRAME.

For example, in the case of a disc having 6 tracks on which data has been recorded, data is recorded as TOC data of sub Q-data as shown in FIG. 11.

As shown in FIG. 11, all of the track numbers TNOs are [00].

The block NO. indicates the number of sub Q-data of one unit read as block data of 98 frames as described above.

In the respective TOC data, the same contents are written over three blocks.

As shown in FIG. 11, when POINT is [01] to [06], the start point of track #1 to track #6 is indicated as PMIN, PSEC and PFRAME.

When POINT is [AO], [01] is indicated as the first track number in PMIN. Also, the type of a disc is discriminated by the value of PSEC, and when the disc is CD-ROM (XA type), PSEC=[20] as shown in the figure. In the case of CD-DA, PSEC becomes [00], and in the case of CD-I, PSEC becomes [10].

The track number of the final track is recorded at a position where the value of POINT is [A1], and the start point of the lead-out area is indicated in PMIN, PSEC and PFRAME at a position where the value of POINT is [A2].

The contents of blocks n to n+26 are repeatedly recorded in block n+27 and the subsequent blocks.

In the tracks #1 to #n and the lead-out area, the sub Q-data recorded therein has information shown in FIG. 10B.

First, a track number is recorded in the lead-out area. In other words, the respective tracks #1 to #n have any track number of [01] to [99]. Also, the track number of the lead-out area is [AA].

Subsequently, information which allows the respective tracks to be further granulated is recorded as an index.

MIN (minute), SEC (second) and FRAME (frame number) are indicated as the elapsed time within a track.

Moreover, the absolute time address is recorded as minute (AMIN), second (ASEC) and frame number (AFRAME) in AMIN, ASEC and AFRAME.

6. Directory Structure

Figure 7:
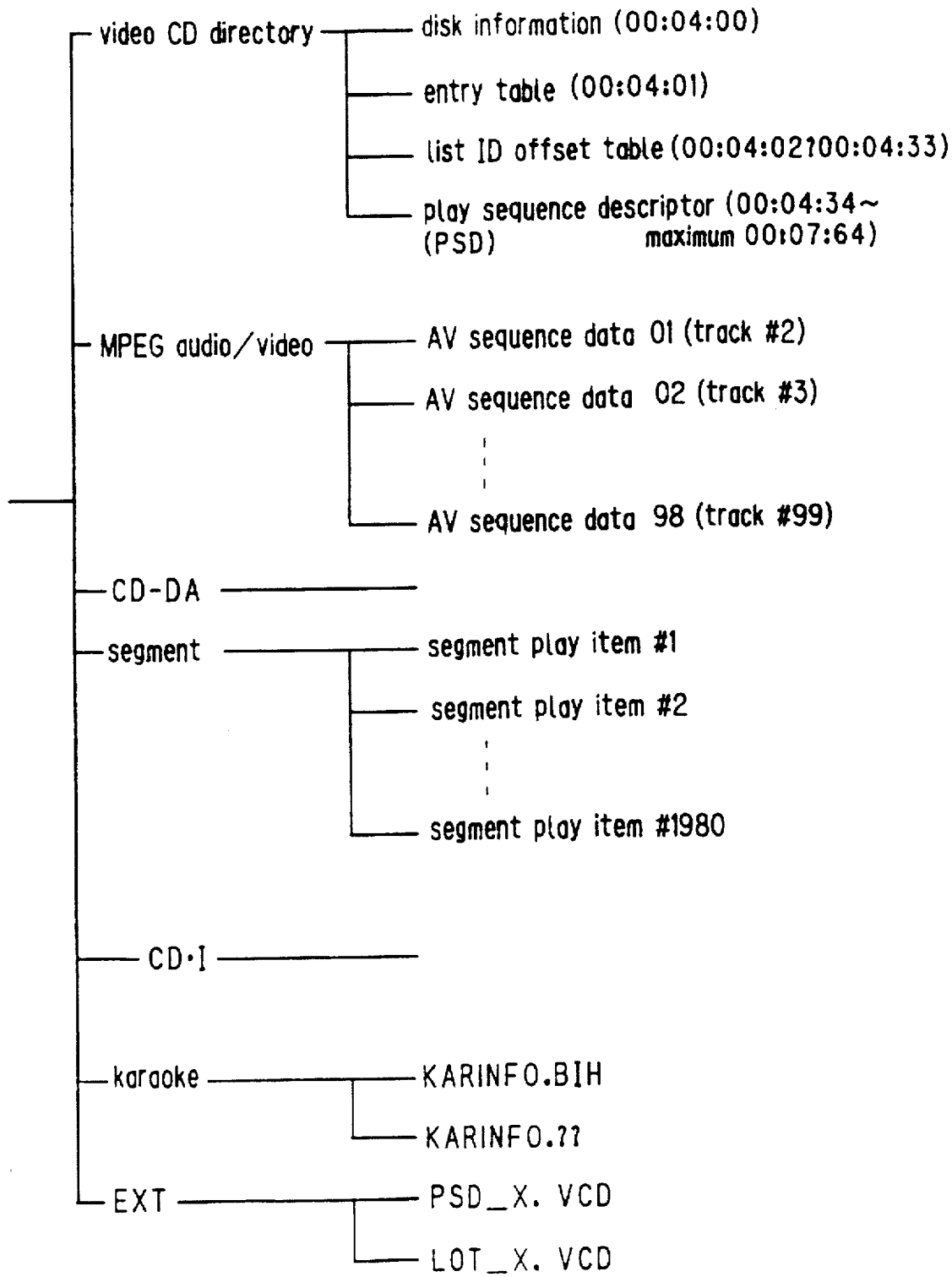
FIG. 7 is an explanatory diagram showing the directory structure of the video CD.

The directory structure of a video CD is shown in FIG. 7.

In the video CD shown in FIG. 6B, a video CD directory, an MPEG audio/video, CD-DA, segment, CD-I, Karaoke and EXT are required as the directory structure as shown in FIG. 7.

The video CD directory is recorded in the video CD information area within the track #1 shown in FIG. 6B and provided with disc information, an entry table, a list ID offset table, and a play sequence descriptor. They will be described later.

The MPEG audio/video is a sequence data of audio/video. That is, in the video CD having 99 tracks on which data can be recorded at the maximum, it is 98 sequence data consisting of track #2 to track #99 at the maximum.

The segment means segment play items #1 to #1980 on which 1980 units can be recorded at the maximum, and recorded in a segment play item area within the track #1.

Further, the CD-I application program within the track #1 has a directory file which is assembled into a directory structure as CD-I. Also, in the case where a Karaoke basic information area is used, its directory file is assembled into the directory structure as Karaoke.

In the case where a track is provided on which only audio data has been recorded, its directory file is assembled into the directory structure as CD-DA. In the case where PSD X. VCD and LOT X. VCD are used, its directory file is assembled into the directory structure as EXT.

7. Control Data Track of Video CD

In the video CD, as described above, the track #1 is used as a control data track.

As described above with reference to FIGS. 6A and 6B, there are provided, in this area, PVD (basic volume descriptor), a Karaoke basic information area, a video CD information area, a segment play item area and other files (CD-I application program, etc.).

As shown in FIG. 6B, PVD is arranged from a position of the absolute time address 00:02:16 on the disc.

Also, the Karaoke basic information area is arranged from a position of the absolute time address 00:03:00.

The video CD information area is arranged from a position of the absolute time address 00:04:00.

Then, the segment play item area is arranged from a position indicated within the video CD information area, and the CD-I application program is arranged from a position indicated within PVD.

a. PVD (Basic Volume Descriptor)

The structure of the PVD (Basic Volume Descriptor) arranged from a position of the absolute time address 00:02:16 is shown in FIG. 12.

First, data of [CD001] is recorded as a volume structure standard ID. Subsequently, a system recognitor, a volume recognitor, the number of volume of an album, and an album set sequence number are recorded. One album is constituted by a single disc or a plurality of discs. The volume number of the album is identical to the number of discs in one album. The number of disc in one album is an album set sequence number.

Subsequently, a logic block size, a pass table, the address of a pass table and a route directory record are recorded.

A disc title is recorded as an album recognitor, and subsequently the names of a publisher and an author are recorded.

Furthermore, the application name of CD-I is recorded as an application recognitor.

Thereafter, the name of a copyright file, the name of a summary file, the name of a catalog file, the date of manufacture, the date of correction, the date of expiration, the effective date, a file structure standard version number, and finally an XA label code are recorded.

b. Video CD Information

The video CD information is recorded from an absolute time address 00:04:00 on the disc.

The video CD information has disc information, an entry table, a list ID offset table and a play sequence descriptor (PSD), as shown in FIG. 13. They are the respective file structures in the video CD directory shown in FIG. 7.

The disc information is arranged from the absolute time address 00:04:00 which is a head position of video CD information.

The entry table is arranged from the absolute time address 00:04:01.

The list ID offset table is arranged from the absolute time address 00:04:02 to the absolute time address 00:04:33.

The play sequence descriptor (PSD) is arranged from the absolute time address 00:04:34, and reaches the absolute time address 00:07:64 at the maximum.

b1—Disc Information

First, the disc information arranged from the absolute time address 00:04:00 will be described.

The area of disc information has a structure shown in FIG. 14.

First, the system recognitor of the video CD is recorded in the first to eighth bytes.

Subsequently, a version number is recorded with two bytes of the ninth to tenth bytes. In the case of the version 2.0, the version number is [$0200]. One album is constituted by a single disc or a plurality of discs. The volume number of the album is identical with the number of discs in one album. The number of disc in one album is an album set sequence number.

The size map of a moving picture track is recorded with 13 bytes of the 31st to 43rd bytes. This is data for discriminating whether data of the respective tracks #2 to #99 is an NTSC signal or a PAL signal. In other words, the first byte LSB of 13 bytes represents the track #2, data until the track #99 each having one bit is recorded from the data #2 to the bit 1 of the last byte. If a bit corresponding to each track is [0], it represents a signal of the NTSC system. If the bit is [1], it represents a signal of the PAL system.

A status flag is recorded with one byte at the 44th byte. In bit 0 to bit 7 of this byte, bit 0 is a flag of a Karaoke basic information.

If bit 0 is [0], no Karaoke basic information exists. If bit 0 is [1], it represents that Karaoke basic information is recorded from the sector of the absolute time address 00:03:00.

The byte size of PSD (play sequence descriptor) is represented with four bytes of the 45 to 48 bytes. As shown in FIG. 13, PSD is recorded from the absolute time address 00:04:34 to the absolute time address 00:07:64 at the maximum, and the byte size is changeable. Therefore, the byte size is represented by that bytes.

PSD which will be described later is formed as a plurality of lists (a selection list, a play list and an end list) used for playback control, and the respective lists are recorded as PSD. When no PSD exists, that is, in the case of a disc having no playback control function, those 4 bytes are [0].

A first segment address is indicated at three bytes of the 49th to 51st bytes. As described above, the start point of the segment play item area is recorded in the video CD information area as shown in FIG. 6B. Those three bytes correspond to the video CD information area.

The segment play item will be described next. The segment play item of 1980 bytes at the maximum can be recorded in the segment play item area shown in FIG. 6B. Video data or audio data used for playback control or the like is recorded as the respective segment play items.

An offset multiplier is recorded in one byte of the 52nd byte. This is a multiplier used for calculating the address of the respective lists within PSD. In this case, it is fixed to [8].

The number of the list ID is represented by two bytes of the 53rd to 54th bytes. This represents the number of the effective list ID recorded in the list ID offset table which will be described later.

The number of the segment play item recorded in the segment play item area is designated in two bytes of the 55th to 56th bytes.

A segment play item content table is recorded in 1980 bytes of the 57th to 2036th bytes. The represents the attribute of the respective segment play items recorded in the segment play item area.

Figure 15:
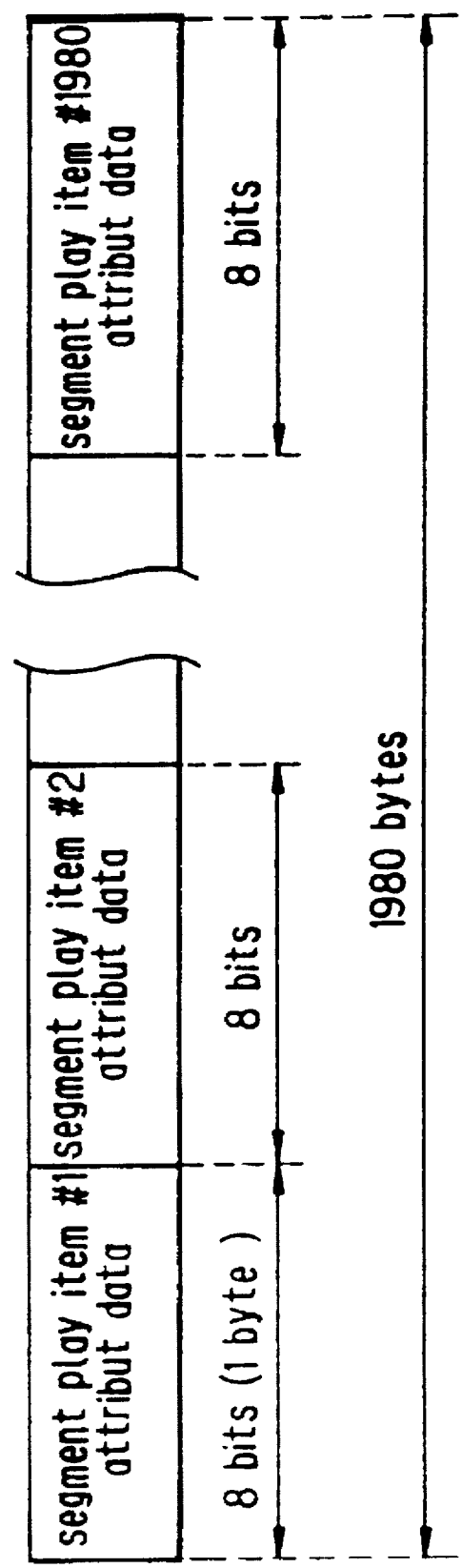
FIG. 15 is an explanatory diagram showing a table of segment play item contents in the disc information of the video CD.

In other words, the 1980 segment play items #1 to #1980 can be recorded at the maximum. In the segment play item contents, the respective attribute data is recorded in association with the segment play items #1 to #1980 byte-by-byte as shown in FIG. 15.

For each bit (bit 0 to bit 7) of one byte, the attribute data is defined as stated below. The bit 6 and the bit 7 are undefined.

Bit 1 and bit 0

[00] . . . No MPEG audio data

[01] . . . Monaural audio data

[10] . . . Stereo audio data

[11] . . . Dual channel audio data

Bit 4 to bit 2

[000] . . . No MPEG video data

[001] . . . Standard level still picture data of NTSC size

[010] . . . High-resolution level still picture data of NTSC size

[011] . . . Moving picture data of NTSC size

[100] . . . Unused

[101] . . . Standard level still picture data of PAL size

[110] . . . Standard and high-fine level still picture data of PAL size

[111] . . . Moving picture data of PAL size Bit 5

[0] . . . Individual item or the head item of the continuous items

[1] . . . Second item or subsequent items of the continuous items

The 2037th to 2048th bytes of disc information subsequent to such segment play item contents are undefined.

b2—Entry Table

As shown in FIG. 13, in the video CD information area, the entry table is arranged from the absolute time address 00:04:01.

In this entry table, a predetermined point within the audio/video sequence can make an entry as a start point.

Therefore, an ID representative of an entry file, a version number, the number of entries and so on are recorded in the entry table, and the entries of 500 at the maximum can be recorded as actual entry points. In other words, entry #0 to entry #499 can be set.

One entry is constituted by 4 bytes, one of which represents a track number, and the remaining three bytes of which represent sector addresses, that is, ASEC, AMIN and AFRAME.

b3—List ID Offset Table

A list ID offset table is arranged in a sector existing between the absolute time addresses 00:04:02 and 00:04:33 in the video CD information area.

The play list and selection list recorded in PSD which will be described inherently have list IDs, respectively. An offset amount representative of the position of each list in PSD is represented in the list ID offset table. When the user designates a desired list that the user wishes to replay, the apparatus for replaying the video CD grasps the position of the designated list within PSD and can execute the list contents by referring to the list ID offset table.

The list ID offset table is constituted by 32 sectors at the maximum as shown in FIG. 16, and each offset amount is represented by two bytes so that the offset of 64K is represented.

The area of PSD which will be described later is located between the absolute time address 00:04:34 and the absolute time address 00:07:64 at the maximum, that is, it becomes 3 seconds 31 frames. This corresponds to 256 sectors which are 512 Kbytes.

The number obtained by multiplying the offset of 64K represented in the list ID offset table by 8 is 512 Kbytes. [8] is an offset multiplier of the 52nd byte of the disc information shown in FIG. 14.

In other words, the offset is a numerical value which represents a predetermined position in the PSD area as a byte position from the head position (the position of an offset [0000]) of the PSD by multiplying the offset position by the offset multiplier [8] because one offset corresponds to 8 bytes.

First, the start-up offset is recorded. This is fixed to a value of [$0000]. The example shown in FIG. 16 is a case where the number of the list IDs is 6, and the respective lists ID1 to ID6 have offset values. In the list ID1 arranged at the head of PSD, the offset value is always fixed to a value of [$0000]. Also, in the unused list ID, the offset value is set to [$FFFF].

b4—PSD (Play Sequence Descriptor)

PSD is provided from the absolute time address 00:04:34. The play list, the selection list and the end list are recorded in PSD. Those lists are used for playback control which will be described later, in which data representative of the replay contents and the hierarchy branch is recorded. The play list includes no data (selection menu) for branching to a lower hierarchy therein, but designates a sequence of contents to be replayed. The selection list includes data (selection menu) for branching to the lower hierarchy. A list (play list or selection list) to be first replayed is set to the list ID1 and recorded at the head position (offset position) of PSD.

Play List

The play list which designates a sequence of contents to be replayed is shown in FIG. 17.

A play list header is first provided and indicated by [10h].

Subsequently, the number of play items recorded in the play list is indicated as the number of items. The play item is representative of the contents to be replayed, in which data for designating play item is recorded, as the play item #1 to #N.

Subsequent to the number of items, the list ID of 2 bytes which is inherent to each list is recorded.

Then, the previous list offset, the next list offset and the return list offset, each consisting of 2 bytes, are recorded.

The previous list offset represents the position (offset) of a list which is to be advanced when the previous operation has been conducted. For example, in the case where a list is graded, if the position of a list having one higher level is designated by the previous list offset, a user can return to the position to the operating state in the previous list by the previous operation. When the previous list offset is [$FFFF], the previous operation is prohibited.

The next list offset represents the position of a list to be sequentially advanced when the replay operation designated by the play list is ended or the next operation is conducted. The next list offset is prohibited from being set to [$FFFF].

The return list offset represents the position of a list to be advanced when the return operation has been conducted. For example, in the case where the list is to be graded, if the position of a list of the highest level is designated by the return list offset, the user can return to the position of the operating state in the list of the highest level by the return operation.

Thereafter, a playing time of 2 bytes, a play item wait time of 1 byte and an automatic pause wait time of 1 byte are recorded. The playing time represents the number of sectors in the replay operation based on the play list. The play item wait time represents a wait time when the replaying of the respective play items is ended. The wait time 0 to 2000 seconds are indicated for [$00] to [$FE]. In the case of [$FF], the operation of the user is expected. The automatic pause wait time represents a wait time in the automatic pause operation.

Finally, Nos. of the play items #1 to #N to be replayed are represented by 2 bytes, respectively. The play item number (PIN) is defined as shown in FIG. 18.

When PIN=[0] or [1], no replay is conducted in its play item. When PIN=[2] to [99], the PIN represents a track No. For example, if PIN=5, the play item becomes a play item for replaying the track #5.

If PIN=[100] to [599], the value of (PIN-100) thereof represents an entry in the entry table. As described above, the entry points of 500 at the maximum can be represented as entries #0 to #499 in the entry table, and any entry number of #1 to #500 is designated as a value of (PIN-100).

When PIN=[1000] to [2979], the value of (PIN-999) represents No. of the segment play item. In the segment play item area, the segment play items of 1980 at the maximum can be recorded as the segment play items #1 to #1980. Any segment play item of #1 to #1980 is designated as a value of (PIN-999).

PIN=[600] to [999] and PIN=[2980] to [$FFFF] are undefined.

For example, it is assumed that 3 play items are recorded in the play list, the play item #1 is [04], the play item #2 is [1001] and the play item #3 is [102]. Then, in the replay operation executed by the play list, the track #4 is first replayed, the segment play item #2 is subsequently replayed, and the replay from the entry point of the entry #3 is finally conducted.

Selection List

The selection list allows the user to select the operation to be advanced by replaying the selection menu, and structured as shown in FIG. 19.

First, a selection list header of one byte is provided, and the selection list is indicated by the selection list header of [18h].

Subsequently, the number of selection elements in the selection list is recorded in the unused area of one byte. The number of selection elements is 99 at the maximum.

Then, the first No. of the selection elements is indicated. This is usually [1], but in the case where a plurality of selection lists are used because No. of selection elements to be selected is large, in the second and following selection lists, the first No. of the selection element is the first selection element No. in the lists. Thereafter, a list ID inherent in each list is recorded in two bytes.

Subsequently, as in the play list, a previous list offset, a next list offset and a return list offset, each consisting of 2 bytes are recorded. In other words, the previous list offset represents the position (offset) of a list to be advanced when the previous operation has been conducted. Also, when the previous list offset is [$FFFF], the previous operation is prohibited.

Also, the next list offset represents the position of a selection list to be sequentially advanced when the next operation has been conducted. In the case where no list to be sequentially advanced exists, the next list offset is set to [$FFFF].

Furthermore, the return list offset represents the position of a list to be advanced when the return operation has been conducted. For example, in the case where one selection is made in a plurality of selection lists, the foregoing offsets are effectively used. For example, if 12 selection elements are set, and 4 selection elements are set in each of 3 selection lists, the respective selection lists are made continuous in series by the previous list offset and the next list offset. As a result, the user can retrieve a desired selection element through the previous operation/next operation.

Further, a default list offset is recorded. This represents the position of a list to be advanced when the execution operation is conducted without the selection made by the user.

Also, the time-out list offset is recorded. This represents the position of a list to be advanced when a predetermined time elapsed without giving an input to the replayed selection menu by the user.

Subsequently, a wait time until timeout is recorded. After the wait time elapses with no input being given by the user, the operation proceeds to the foregoing timeout list offset.

Thereafter, a loop count and a jump timing are indicated. The loop count represents the number of times of repeatedly replaying the play item in this list. The jump timing represents a timing at which the operation proceeds to the next list after the selection operation has been made.

Subsequently, a play item number (PIN) is provided. PIN represents the play item to be replayed in the execution state of the selection list as shown in FIG. 18 which was described above. What is replayed by the selection list is a normal menu screen. For that reason, menu video data is recorded as the segment play item, and there are many cases in which a specified segment play item is designated in the respective selection lists.

For example, in the case where the menu image data corresponding to the selection list is recorded as the segment play item #4, the play item No. is [0003]. In this way, the selection list is provided with one PIN.

Finally, a selection #BSN offset to a selection #(BSN+NOS-1) offset are represented by 2 bytes, respectively, in order to actually represent the operation to be executed by the selection within the selection elements. BSN is the first number of the selection element to be recorded at the fourth byte of the selection list, and NOS is the number of selection elements recorded at the third byte of the selection list. Therefore, in the selection list having the selection elements 1 to 4, the selection #1 offset to the selection #4 offset are recorded.

The respective selection offsets represent the position of a list (selection list or play list) to be advanced in the case where the selection element 2 is selected by the user. For example, when the user selected the selection element 2 with respect to the menu display, the selection offset of this type designates to proceed to a list shown the selection #2 offset.

End List

An end list represents the end of application. The structure the end list is of 8 bytes where one byte is an end list header and 7 bytes are [$00].

c. Segment Play Item

The video CD data track shown in FIG. 6B is provided with a segment play item area. The start point of the segment play item area is indicated by 3 bytes of the 49th to 51st bytes of the disc information shown in FIG. 14.

The segment play items of 1980 at the maximum can be recorded in the segment play item area. The respective segment play items can be freely produced by still picture data, moving picture data, audio data and so on, respectively.

One segment is 150 sectors. The respective segment play items may be data to be replayed as an independent item, or a plurality of items which are sequentially replayed.

The respective play items, as was described with reference to FIG. 15, have data attributes represented by the segment play item contents of 57th to 2036th bytes in the disc information. The menu screen of the selection list and so on can be prepared, as described above, by the use of the segment play item.

II. Playback Control (PBC)

1. List Structure

As described above, the play list and the selection list can provide a so-called playback control (PBC) in the video CD. This is a function of realizing the video CD as a simple interactive software which combines a moving picture, a still picture and audio together.

In other words, still picture data forming several menu screens as the segment play items is prepared in the segment play item area, and a several branch replay is enabled by the selection list. The play item selected by the branch is replayed in accordance with the play list. In other words, a description file which is graded in accordance with the selection list and the play list is formed, and the operation proceeds to the lower level in accordance with the selection by the user, thereby executing a necessary replay operation.

As a basic list structure, a selection list is arranged at the highest level, and several play lists are arranged as the selection elements of the selection list. For example, as the selection #1 offset to the selection #3 offset of the foregoing selection list, specified play lists are designated, respectively. Then, the menu display is executed in the selection list so that the user can select the menu.

For example, if the user selects the selection #3, the operation proceeds to the play list indicated in the selection #3 offset, thereby replaying data indicated as the play items #1 to #N. For example, if a track #5 is designated as one play item #1 in the advanced play list, the replay of the track 5 is executed.

2. Example

An example of the operation of the foregoing playback control (PBC) will be described with reference to FIGS. 20 and 21. This example is a case where data of an English conversion lesson is recorded on the video CD.

Figure 20:
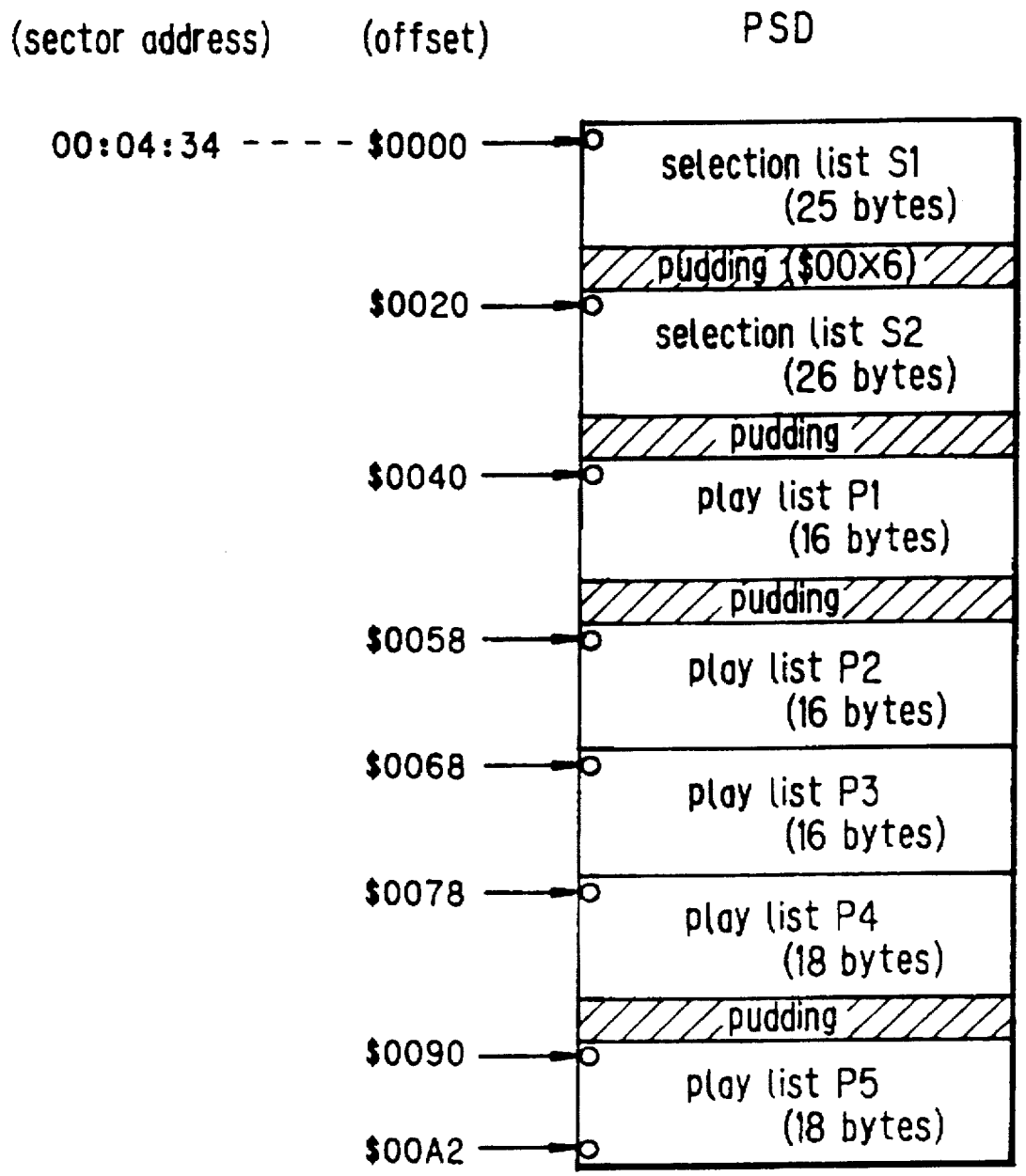
FIG. 20 is an explanatory diagram showing the list structure of the video CD.

Now, it is assumed that a list shown in FIG. 20 is recorded as PSD from the position of the absolute time address 00:04:34 within the video CD information area. In other words, it is assumed that selection lists S1, S2 and play lists P1 to P5 are recorded.

Figure 21:
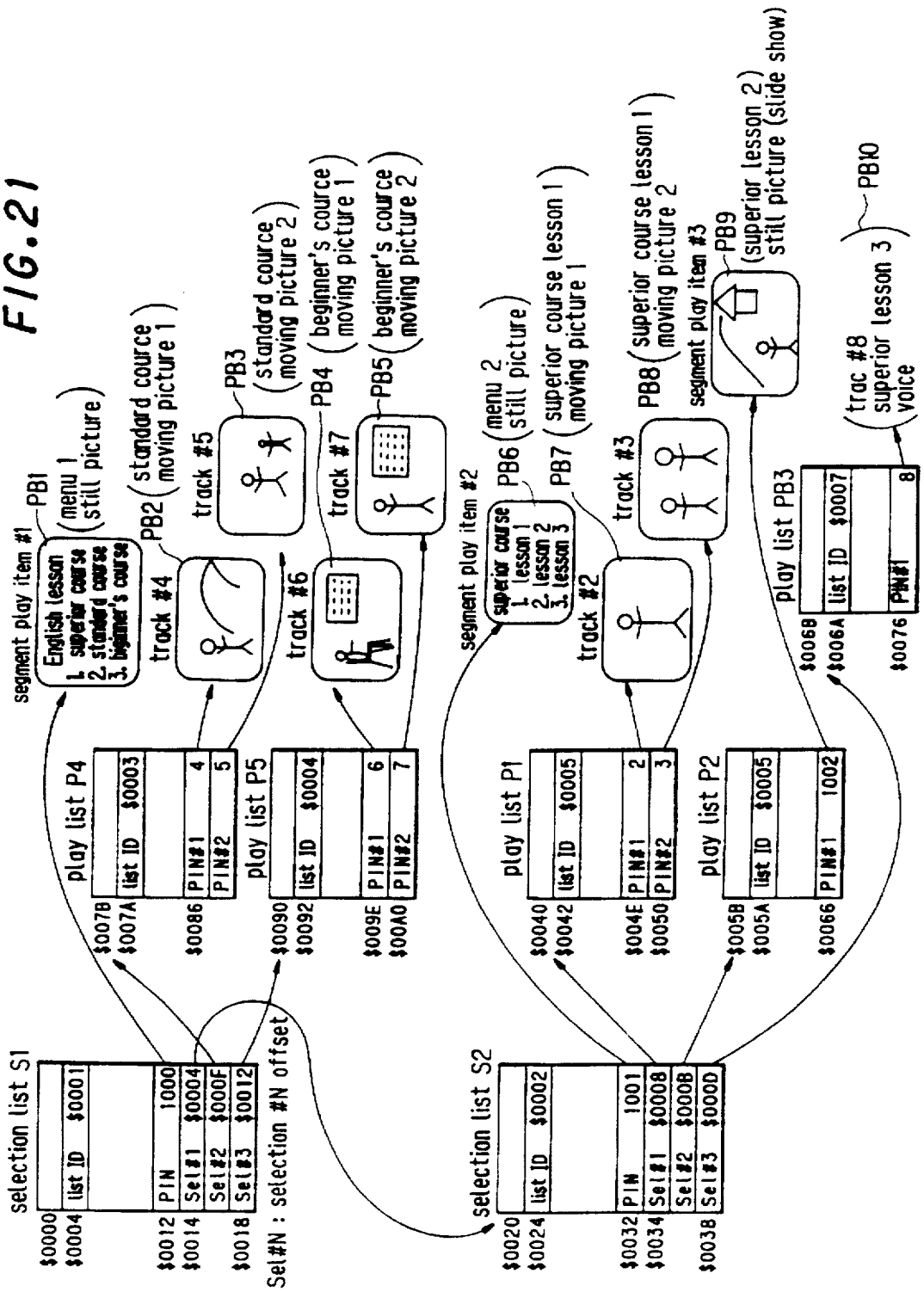
FIG. 21 is an explanatory diagram showing the playback control operation in accordance with the list structure of the video CD.

In each of the lists, a list ID is attached thereto as shown in FIG. 21. In other words, the list ID is set so that the selection list S1 is $0001, the selection list S2 is $0002, the play list P1 is $0005, the play list P2 is $0006, the play list P3 is $0007, the play list P4 is $0003 and the play list P5 is $0004.

After the playback control operation is started, the selection list S1, where the list ID is $0001, first functions. As the operation for the selection list S1, the replay for the play item No. (PIN) recorded therein is first conducted. A value of [1000] is indicated in the PIN. Because [1000] in the PIN is a numerical value indicating a segment play item #1 as understood from FIG. 18, the segment play item #1 recorded in the segment play item area is replayed.

The replay output of the segment play item #1 is a still picture menu screen for selecting the course of an English lesson by indicated as PB1. A selection #1 offset to a selection #3 offset which correspond to three selection elements are recorded in the selection list S1. Accordingly, three selection elements are displayed due to the replay output video for the segment play item #1. [Sel#N] in the figure indicates the selection #N offset.

The user inputs a desired selection element No. to the video PB1. If the selection element No. 1 is inputted, the operation proceeds to a list indicated by the selection #1 offset. The selection #1 offset is [$0004], and therefore [$0020] is obtained by multiplying that numerical value by an offset multiplier [8]. This is an offset byte of the selection list S2 within PSD.

A value [1001] is indicated in PIN of the selection list S2. In other words, this indicates the segment play item #2. As a result, the segment play item #2 is replayed. The replay output PB6 of the segment play item #2 becomes a still picture menu screen for selecting lesson courses 1 to 3 in the superior course of the English lesson.

On the other hand, if the user inputs the selection element No. 1, the operation then proceeds to a list indicated by the selection #1 offset in the selection list S2. The selection #1 offset is [$0008], and therefore [$0040] is obtained by multiplying that numerical value by the offset multiplier [8]. In other words, the operation proceeds to a play list P1.

In the play list P1, the value of PIN#1 is [2] and a track #2 is designated. A value of PIN#2 is [3] and a track #3 is designated. For that reason, when the operation proceeds to the play list P1, the track #2 is replayed and a moving picture (and audio) PB7 is outputted. This results in the moving picture and audio of the superior course lesson 1. After the replay of the track #2 has been completed, the track #3 is subsequently replayed so that a moving picture (and audio) PB8 is outputted.

If the user inputs the selection element No. 2 while a menu video PB6 is outputted through the selection list S2, the operation proceeds to a list indicated by the selection #2 offset in the selection list S2, that is, the play list P2.

In the play list P2, the value of PIN#1 is [1002] and the segment play item #3 is designated. For that reason, when the operation proceeds to the play list P2, the segment play item #3 is replayed, and a still picture (and audio) PB9 is outputted. For example, a superior course lesson 2 is a case in which a lesson is based on a slide show.

If the user inputs the selection element No. 3 while the menu video PB6 is outputted through the selection list S2, the operation proceeds to a list indicated by the selection #3 offset in the selection list S2, that is, the play list P3.

In the play list P3, a value of PIN#1 is [8] and a track #8 is designated. It is assumed that the track #8 is a track for only digital audio data. Then, the track #8 is replayed as the superior course lesson 3 so that an output PB10 for only audio is conducted.

Subsequently, if the user inputs a selection element No. 2 which is a medium course while the menu video PB1 is outputted through the first selection list S1, the operation then proceeds to a list indicated by the selection #2 offset in the selection list S1, that is, the play list P4.

In the play list P4, PIN#1=[4] and a track #4 are designated. Also, PIN#2=[5] and a track #3 are designated. Accordingly, upon proceeding to a play list P4, the track #4 is first replayed so that the moving picture (and audio) PB2 is outputted. Subsequently, the track #5 is replayed so that the moving picture (and audio) PB3 is outputted. This results in the moving picture and audio of the medium course.

Also, if the user inputs a selection element No. 3 which is a beginner course while the menu video PB1 is outputted through the first selection list S1, the operation then proceeds to a list indicated by the selection #3 offset in the selection list S1, that is, the play list P5.

In the play list P5, a track #6 is designated with PIN#1= [6]. Also, a track #7 is designated with PIN#2=[7]. Accordingly, upon proceeding to a play list P5, the track #6 is first replayed so that the moving picture (and audio) PB4 is outputted. Subsequently, the track #7 is replayed so that the moving picture (and audio) PB5 is outputted. This results in the moving picture and audio of the beginner course.

As described above, the previous list offset, the next list offset and the return list offset can be recorded in the play list and the selection list. Also, the default list offset and the timeout list offset can be recorded additionally in the selection list. As a result, the progress, the regress and so on of the list can be executed in accordance with an operation, etc.

For example, if [$0004] has been recorded as the previous list offset of the play list P1, the operation returns to the selection list S2 where the offset is [$0004], that is, offset bytes [$0020] by executing the previous operation by the user during the action of the play list P1.

As described in the foregoing example, the video CD can include a simple interactive software through playback control. With such a function, the video CD can cope with not only music or movie but also various wide other activities such as education, game or electronic publication.

[III. Structure of Replay Apparatus]

1. Appearance

Subsequently, a description will be given of a replay apparatus which is capable of replaying the foregoing video CD in accordance with one embodiment of the present invention.

The replay apparatus of this embodiment include a disc exchangeable function which is capable of accommodating 5 video CDs and/or CD-DAs to selectively replay them.

Figure 22:
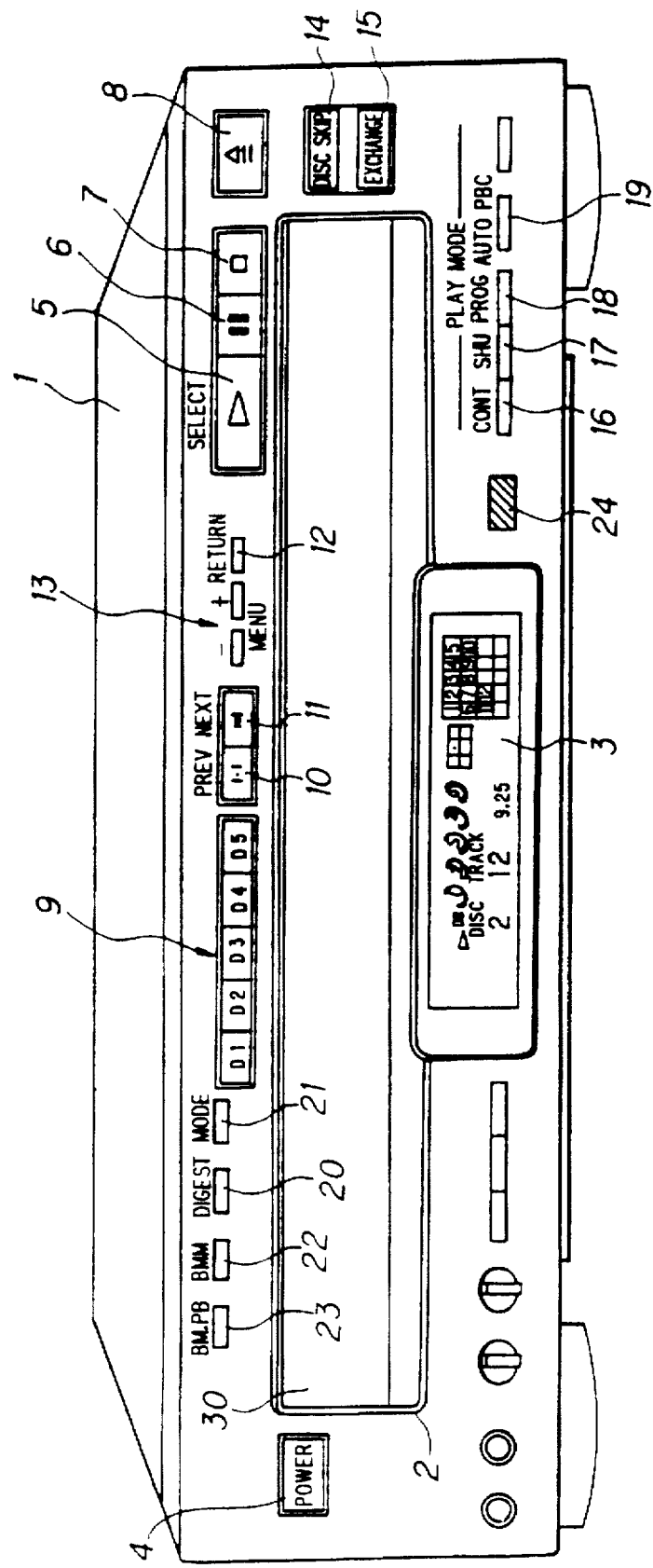
FIG. 22 is an explanatory diagram showing an appearance of a replay apparatus in accordance with an embodiment of the present invention.

FIG. 22 shows a digram of an appearance of the replay apparatus.

The replay apparatus includes a front panel of a replay apparatus body 1, which defines an opening 2 therein. The opening 2 is covered by the front portion of a disc tray 30. A circular rotary table 30a having a plurality of receivers for accommodating a plurality of discs mounted thereon is rotatably disposed in the disc tray 30. In this embodiment, the plurality of receivers formed in the rotary table 30a are radially arranged on one surface of the rotary table 30a with respect to the center of the rotary table 30a so that 5 discs can be accommodated in and mounted on the rotary table 30a. The plurality of receivers are formed as circular recesses slightly larger than the outer diameter of the disc. The bottom surface of the respective receivers has an opening which allows a light beam from an optical head, which will be described later, to be irradiated on the disc therethrough. The rotary table 30a is rotated by a drive mechanism not shown. As a result, a disc accommodated in one of the plurality of receivers selectively faces the optical head. The disc tray 30 is moved between an eject position which projects from the opening 2 and a position at which the opening 2 is closed, as shown in FIG. 22. One of the plurality of receivers of the rotary table 30a in the disc tray 30 is located opposite the optical head in a state shown in FIG. 22 (as to a mechanism, including the structure of the disc tray in the replay apparatus, reference is made to U.S. Pat. No. 5,123,005, for example).

In FIG. 22, reference numeral 3 denotes a display unit including a liquid-crystal panel, on which information relating to the operating state of the replay apparatus, modes, No. of a selected disc, a performance time and so on is displayed.

On the front panel, a variety of keys manipulated by the user are provided, such as a power on/off key 4, selection keys (selection enter key) manipulated when conducting the foregoing playback control operation, a replay key 5, a temporary stop key 6, a stop key 7 and an ejection key 8 used for conducting the eject operation of the disc tray 30.

The disc selection key 9 includes five keys [D1] to [D5] which correspond to five discs mounted on the rotary table 300 of the disc tray 30. For example, when the key [D1] is depressed, the disc situated in a first receiver on the disc tray is loaded into a position opposite the optical head, which will be described later, and then replayed.

A key 10 is a head position key (backward head position key) conducting the positioning operation in the direction of a smaller track No., and a key 11 is a head positioning key (forward head search key) conducting the positioning operation in the direction of a larger track No. The backward head positioning key 10 also acts as a previous function key and used for the previous operation when conducting the foregoing playback control operation. A return key 12 is used for the return operation when conducting the playback control operation.

A +/− selection key 13 is used for the selection operation on the menu screen when conducting the playback control operation. In other words, the selection element No. is selected through the +/− selection key 13 with respect to the menu screen, and when a certain selection element No. is designated, the selection operation is conducted through the replay key 5, whereby the selection for the menu is completed.

Reference numeral 14 denotes a disc skip key, and reference numeral 15 denotes a disc change key. Reference numerals 16 to 19 denote play mode selection keys. When a disc to which a playback control function is added is to be replayed, the operation is automatically changed over to the playback control operation by depressing the normal replay mode key 16. Reference numeral 17 denotes a random replay mode key, and reference numeral 18 denotes a program replay mode key. A PBC off key 19 allows a PBC mode to be turned off. In other words, in the case where a disc with the playback control function is loaded in the apparatus, when the PBC off key 19 is depressed, the menu replay operation in the PBC mode is changed to the normal sequential replay operation.

A digest key 20 is manipulated to allow the digest video for the respective accommodated discs to be displayed. A digest mode key 21 is manipulated so as to selectively change the digest video fore the disc having the playback control function to a menu image or a video within a track.

If the user depresses a book mark register key 22 during the replay operation, data relating to an address of the replay point, etc. is registered in a memory which will be described later. Thereafter, with the depression of the book mark replay key 23, data is read out from the memory and can be replayed from the registered point. For example, five replay points for one disc are designated and registered through the book mark register key 22.

When one of the registered book mark points is selected after the depression of the book mark replay key 23, replay is started from its replay point. For example, the +/− selection key 13 and the replay key 5 functioning as the selection key are used for the selection of the registered book mark points.

Reference numeral 24 denotes an infrared ray receiving unit. When a command signal is transmitted in the form of infrared rays from a remote commander (not shown), it is received by the infrared ray receiving unit 24 and converted into an electric signal. Then, the electric signal is supplied to a system controller which will be described later as operation information, thereby performing the change-over control for the operating state of the apparatus.

2. Circuit Block

Figure 23:
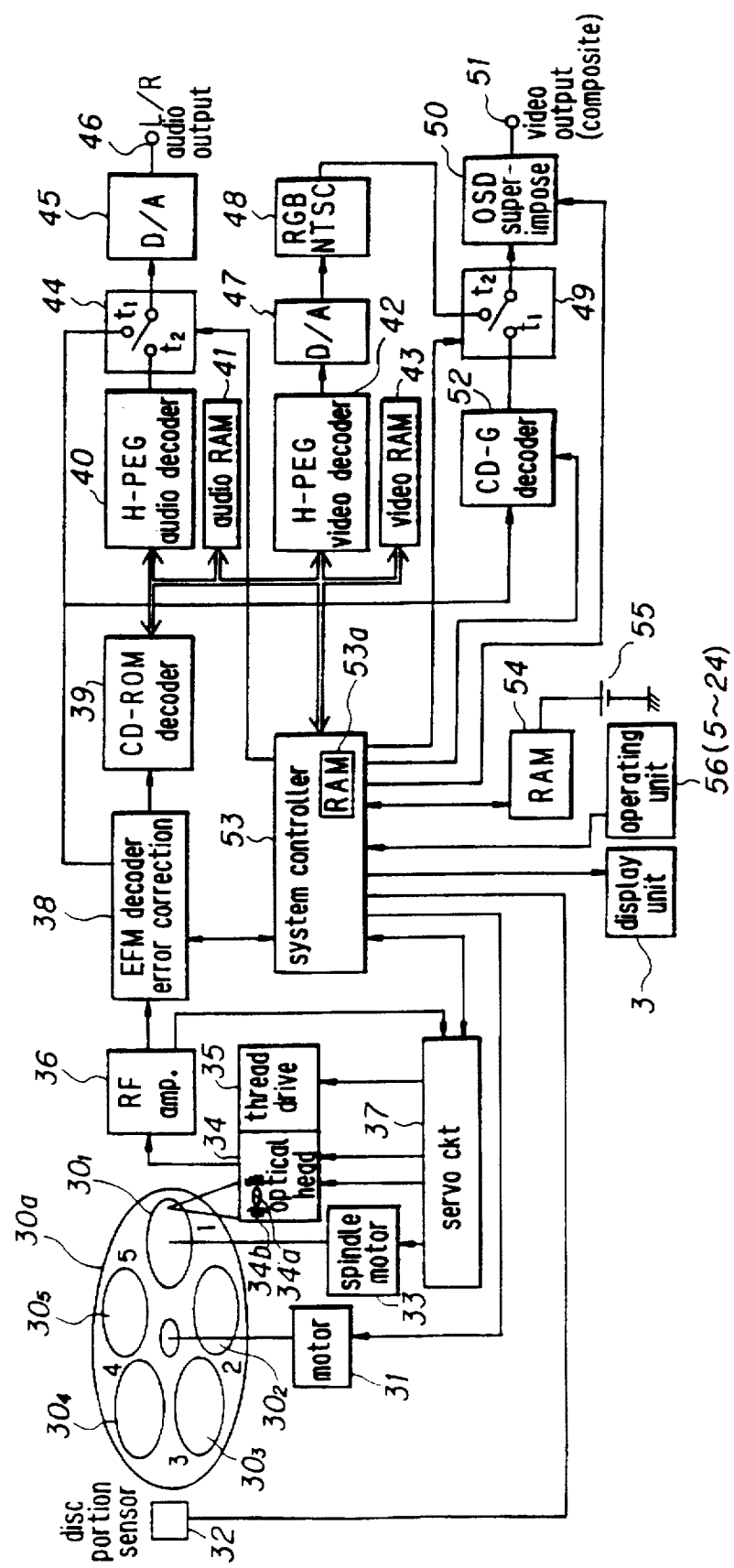
FIG. 23 is a block diagram showing the replay apparatus in accordance with the embodiment.

FIG. 23 shows a block diagram of a replay apparatus.

In FIG. 23, as described above, the rotary table 30a of the disc tray 30 is provided with receivers $30_1$, $30_2$, $30_3$, $30_4$ and $30_5$ on which five discs are mounted. The rotary table 30a of the disc tray 30 is so arranged to be rotated by a motor 31. With the rotating operation of the rotary table 30a, a certain single receiver $30_x$ (x=1, 2, 3, 4, 5) is transported to a position opposite the optical head 34. In other words, a disc mounted on that receiver $30_x$ is loaded at a position opposite the optical head 34. Reference numeral 32 denotes a disc position sensor. With an output of the disc position sensor 32, a system controller 53 consisting of a microcomputer can grasp the present loading state, that is, which receiver $30_x$ is located at the position of the optical head 34.

The disc moved the position opposite to the optical head 34 is rotated by a spindle motor 33 and then chucked by a disc table fixed to a tip of the rotary shaft of the spindle motor 33 and a chucking plate not shown. Then, while the disc is being rotated by the spindle motor 33 keeping its linear velocity constant, a light beam is irradiated onto the disc by the optical head 34, and information is read from its reflected light.

The optical head 34 includes a laser diode as a light source, an optical system consisting of a polarization beam splitter, an objective lens, and a photodetector for detecting a reflected light. The objective lens 34a is displaceably held by the actuator 34b in a radial direction of the disc, that is, a tracking direction and in a direction along which the objective lens 34a is in or out of contact with the disc, that is, in a focussing direction. Reference numeral 35 denotes a feed mechanism for moving the optical head 34 in the radial direction of the disc.

During the replay operation, an output signal from the photodetector of the optical head 34 is supplied to an RF amplifier 36. The RF amplifier 36 subjects the supplied output signal to an arithmetic processing to produce an RF signal, a tracking error signal, a focussing error signal and so on. Then, the produced RF signal is supplied to a decoder 38 to be subjected to EFM demodulation as well as error correction. Also, p- and q-channel sub-code data is extracted from the decoder 38 and supplied to the system controller 53.

The tracking error signal and the focussing error signal are supplied to a servo circuit 37. The servo circuit 37 generates a variety of servo drive signals in accordance with the supplied tracking error signal and focussing error signal as well as a track jump command and seeking command from the system controller 53, the rotational speed detection information of the spindle motor 33, and so on. The various servo drive signals thus generated are supplied to the actuator 34b and the feed mechanism 35 to execute the focussing and tracking control. Also, the servo drive signals allow the spindle motor 33 to be controlled for maintaining constant linear velocity (CLV).

Reference numeral 39 denotes a CD-ROM decoder. The CD-ROM decoder 39, in the case where a disc which is replayed falls under the category of CD-ROM such as a video CD, executes a decoding processing in accordance with a CD-ROM format. The various disc information, to such as information for the foregoing playback control, relating the signals decoded by the CD-ROM decoder 39, is stored in the RAM 53a of the system controller 53.

The audio data decoded by the CD-ROM decoder 39 is supplied to an MPEG audio decoder 40. The MPEG audio decoder 40 decodes the audio data thus supplied and outputs a decoded audio signal at a predetermined timing, using an audio RAM 41.

Furthermore, the video data decoded by the CD-ROM decoder 39 is supplied to an MPEG video decoder 42. The MPEG video decoder 42 decodes the video data thus supplied and outputs a decoded video signal (RGB output) at a predetermined timing, using a video RAM 43.

A switch 44 is changed over in accordance with the kind of a disc to be replayed. In the case where a disc which is being replayed is CD-DA, a replay signal is subjected to a decoding processing such as an EFM modulation and CIRC by the decoder 38, thereby obtaining a digital audio signal.

During the replay operation of CD-DA, the switch 44 is connected to a terminal $t_1$ in accordance with a control signal from the system controller 53. Therefore, the digital audio signal from the decoder 38 is converted into an analog audio signal through a D/A converter 45 and then outputted from an audio output terminal 46 to an external equipment such as an amplifier circuit or amplifier disposed at a post-stage.

In the case where a disc which is being replayed is a video CD, the audio data is obtained from the MPEG audio decoder 40. During the replay operation of the video CD, the switch 44 is connected to a terminal $t_2$ in accordance with the control signal from the system controller 53. Therefore, the digital audio signal from the MPEG audio decoder 40 is converted into an analog audio signal through a D/A converter 45 and then outputted from an audio output terminal 46 to an external equipment such as an amplifier circuit or amplifier disposed at a post-stage.

In replaying the video CD, an RGB video data is obtained as an output signal of the MPEG video decoder 42. The RGB video data is converted into an RGB analog signal through a D/A converter 47. The RGB analog signal from the D/A converter 47 is supplied to an RGB/NTSC encoder 48, whereby the RGB signal is converted into a composite video signal of the NTSC system. The composite video signal is supplied to the terminal $t_2$ of the switch 49.

During the replay operation of the video CD, the system controller 53 connects the switch 49 to the terminal $t_2$. Consequently, the composite video signal of the NTSC system is supplied from the video output terminal 51 to a monitor device or the like through the OSD processor 50. A predetermined display can be superimposed on the output video in accordance with the operation of the OSD processor 50 based on an instruction from the system controller 53.

In a meantime, in the case where a disc to be replayed is CD-DA and also CD-G, still image data is read out from R to W channels of the sub-code. The still image data is supplied to a CD-G decoder 52 to be decoded, and outputted as a composite video signal (still picture) of the NTSC system. During the replay operation of CD-DA, the switch 49 is connected to the terminal $t_1$, and the video signal obtained from CD-G is supplied from the video output terminal 51 to the monitor device or the like through the OSD processor 50, thereby executing a video output. Similarly, in this case, a predetermined display can be superimposed on the output video.

A memory 54 includes a RAM, and the backup power of memory data is provided by a backup power supply 55. Stored in the memory 54 is data which must not vanish when power is off, such as the register data of the foregoing book mark point. An EEP-ROM or the like may be used for the memory 54.

Reference numeral 56 denotes an operation input section which is manipulated by the user. A variety of operation keys 5 to 23 shown in FIG. 22, an infrared ray receiving unit 24 and a mode commander (not shown) correspond to the operation input section 56.

When the replay operation of the disc is conducted, management information recorded on the disc, that is, TOC data and sub-code data are read out and then supplied to the system controller 53. The system controller 53 makes the display unit 3 display a replay time, etc. accordance with the management information.

[IV. Book Mark Operation]

1. Summary of Book Mark Operation

As described above, in the replay apparatus 1 of the present invention which is capable of replaying the video CD, using the registration of the book mark, the user can directly execute a replay from a point at which the book mark has been registered without pursuing the hierarchies of the selection list and the play list.

Figure 24:
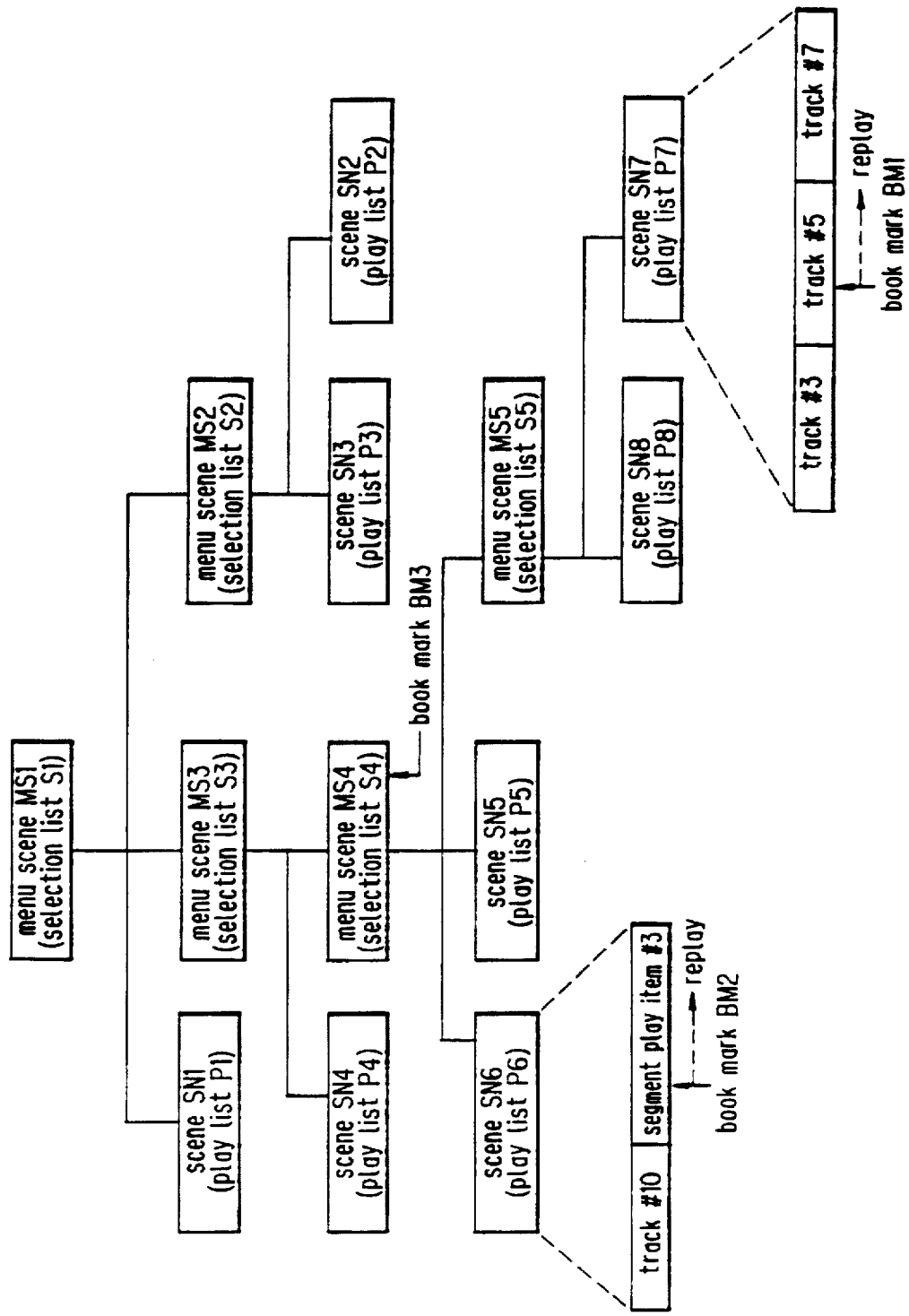
FIG. 24 is an explanatory diagram showing an example of the list structure of the playback control function in accordance with the embodiment.

Now, it is assumed that, for example, a hierarchy structure shown in FIG. 24 is set by the selection lists S1 through S5 and the play lists P1 through O8.

In other words, first in the selection list S1, a menu video (menu scene MS1) due to a certain segment play item which has been designated in the selection list S1 is replayed. The user is required to select three selection elements. One of three selection elements proceeds to the play list P1,and a certain track (scene 1) designated by the play list P1 is replayed. Two other selection elements further proceed to the selection lists S2 and S3, that is, further proceed to a lower hierarchy.

It is assumed that the user selects the selection elements so that the operation proceeds to the selection list S1, the selection list S3, the selection list S4, the selection list S5 and the play list P7 in the stated order, and a track #3, track #5 and track #7 represented as play item Nos. are replayed in the play list P7.

It is also assumed that the user conducts the operation of the book mark register during the replay operation of the track #5 subsequent to the track #3 in accordance with the play list P7. Then, the point during the operation is registered in the memory 54 as a book mark BM1 together with the disc discrimination information.

In keeping with such a situation, even after the disc has been taken out from the replay apparatus once, if the book mark replay operation for designating the book mark BM1 is conducted when the same disc is to be replayed again, the replay apparatus of the present invention reads out the point registered as the book mark BM1 for that disc from the memory 54 to enable the disc to be replayed directly from the middle portion of the track #5. In other words, the user can replay the disc by advancing the book mark BM1 to the registered point with one step without conducting the operation of proceeding to the selection list S1, the selection list S3, the selection list S4, the selection list S5 and the play list P7 in the stated order.

Also, it is assumed that the user makes a selection so as to proceed to the selection list S1, the selection list S3, the selection list S4 and the play list P6 in the stated order, whereby the segment play item #3 of the track #10 indicated as play item No. is replayed at the play list 6. It is also assumed that the user conducts the operation of the book mark registration during the replay operation of the segment play item #3. Then, the point during that operation is registered in the memory 54 as a book mark BM2 together with disc discrimination information.

It is assumed that the book mark registration operation is conducted while the menu display (menu scene MS4) is being executed by the selection list S4. The point during that operation is registered in the memory 54 as a book mark BM3 together with disc discrimination information.

Similarly, in the book marks BM2 and BM3, if the book mark replay operation for designating the book mark BM2 or BM3 is conducted when the disc is to be replayed, the replay operation is started from the point registered in the memory 54 as the book mark BM2 or BM3.

2. Book Mark Registration Operation

The operation of registering a book mark will be first described as the function of the foregoing book mark.

It should be noted that the book mark function is applicable to not only the video CD on which the play list and the selection list having the playback control function have been recorded, but also the CD-DA and the video CD providing no playback control function. The processing during the operation of registering the book mark is different depending on the type of the disc as used. Also, the replay apparatus 1 of this embodiment first conducts the processing of discriminating the type of the disc to be replayed because such a processing is necessary for discriminating the execution of the playback control function as well as the switching operation of the switches 44 and 49 in the case of CD-DA.

After a certain disc on the rotary table 30a of the disc tray 30 is selected, conveyed a position opposite the optical head 34 and then chucked, the operation of replaying the disc is started. In other words, while the spindle motor 33 is started to allow the disc to be rotated, a light beam from the optical head 34 is irradiated on the disc. On the basis of information read out from the disc during this operation, the type of the disc is first discriminated.

Figure 27:
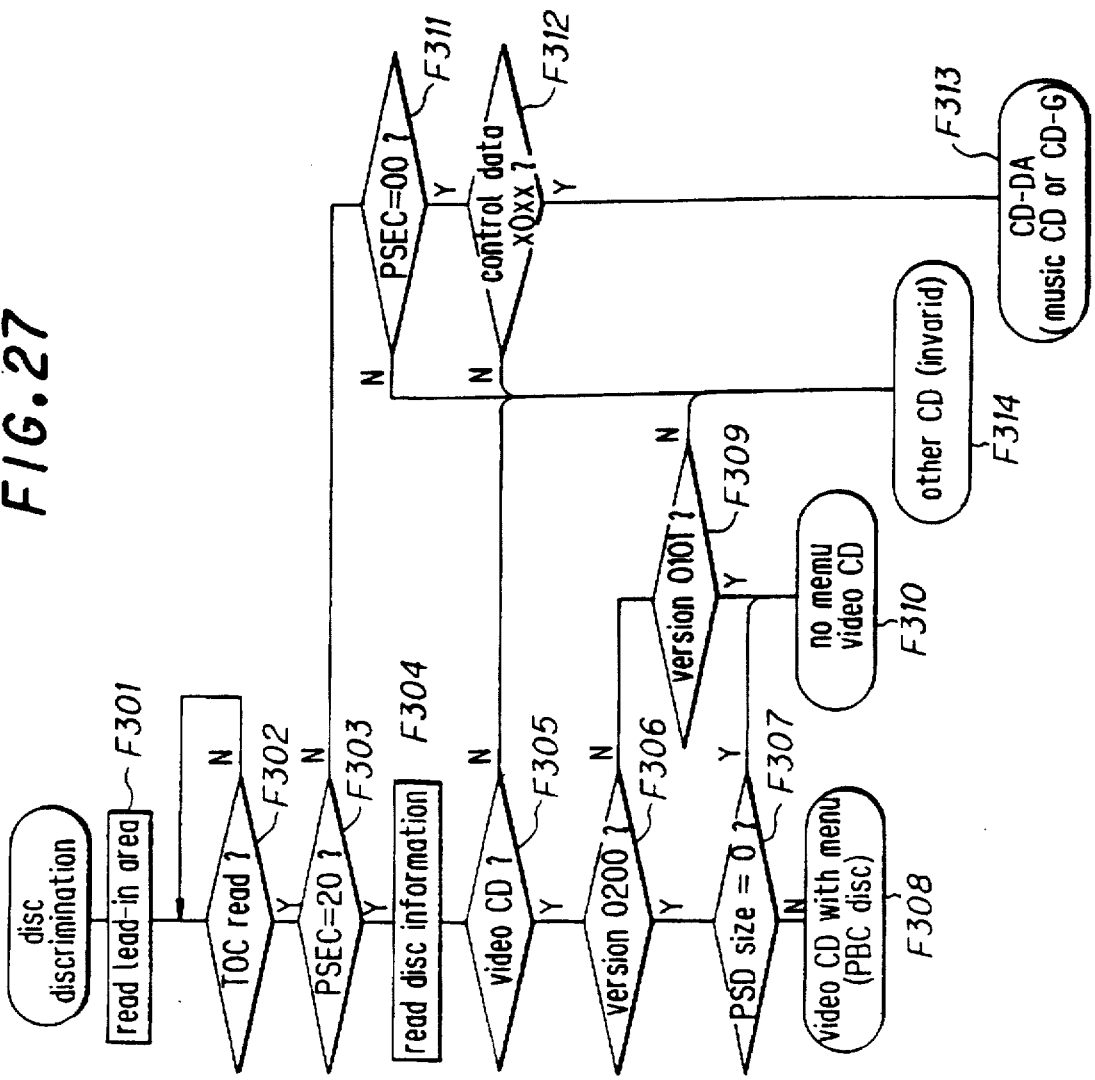
FIG. 27 is a flowchart showing the processing of discriminating a disc in accordance with the embodiment.

The discrimination of the disc is conducted with the processing shown in FIG. 27.

First, the lead-in area of the disc is replayed, and TOC data is read in (F301, F302). In this situation, as described in FIG. 11, if PSEC=[20] in a block where POINT is [A0], the disc is CD-ROM of the XA type. On the other hand, if PSEC=[00], the disc is CD-DA, whereas if PSEC=[10], it is CD-I.

Then, PSEC in the block where POINT is [A0] is confirmed (F303), and if it is determined that PSEC is [20] and the disc is of CD-ROM of the XA type, the operation proceeds to Step F304. Then, data of disc information from the absolute time address 00:04:00 is read in. In the disc information shown in FIG. 14, if [VIDEO CD] is recorded in a system recognitor which is a head of the information area, it is recognized that the disc is the video CD. In this case, the operation is advanced from Step F305 to Step F306. Then, a version No. subsequent to the system recognitor is confirmed.

If the version No. is [$0200], the disc as used is the version 2.00. In this case, there is a possibility that the playback control function is added to the disc. For that reason, data of the PSD size at the 45th to 48th bytes of the disc information is confirmed in Step F307. As described above, in the case of a disc providing the playback control function, the size of an PSD area is indicated, and if no playback control function is added to the disc, the size of the PSD area is indicated as [0].

Therefore, if the size of PSD is not [0], it is determined that the disc is the video CD with a menu to which the playback control function is added (F308).

On the other hand, if the size of PSD is [0], no playback control function is added to the disc. In other words, it is determined that the disc is the video CD without a menu (F310).

Also, if version No. is [$0101] in Step F306, the disc is the version 1.01. In this case, since no playback control function can be added to the disc, it is determined that the disc is the video CD without a menu (F310).

If it is determined that PSEC is not [20] in Step F303, it is decided whether PSEC is [00] or not in Step F311. Further, it is confirmed whether control data ($Q_1$ to $Q_4$) within sub Q-data is [x0xx] or not in Step F312. If the affirmative results are obtained in Steps F311 and F312, it is established that the disc is CD-DA (F313).

If a negative result is obtained in any one of Steps F311, F312, F305 and F309, because the disc is another type which is not applicable to the replay apparatus of this embodiment, it is determined that the disc is invalid (F314).

After the disc has been identified according to the processing shown in FIG. 27, a required operation is executed in accordance with the operation of the user, such as the replay operation.

Although not shown in the flowchart of FIG. 27, in case of the video CD and the CD-DA, disc discrimination data is produced from TOC data. The disc discrimination data is produced from, for example, a value combining track No. of the final track in the disc with a total performance time. Because that value is hardly identical in different disc software, it becomes discrimination data inherent in the respective disc software. As a result, it can be discriminated and checked whether the disc, which is now being replayed, is a disc in which a book mark has already been registered or not.

Figure 28:
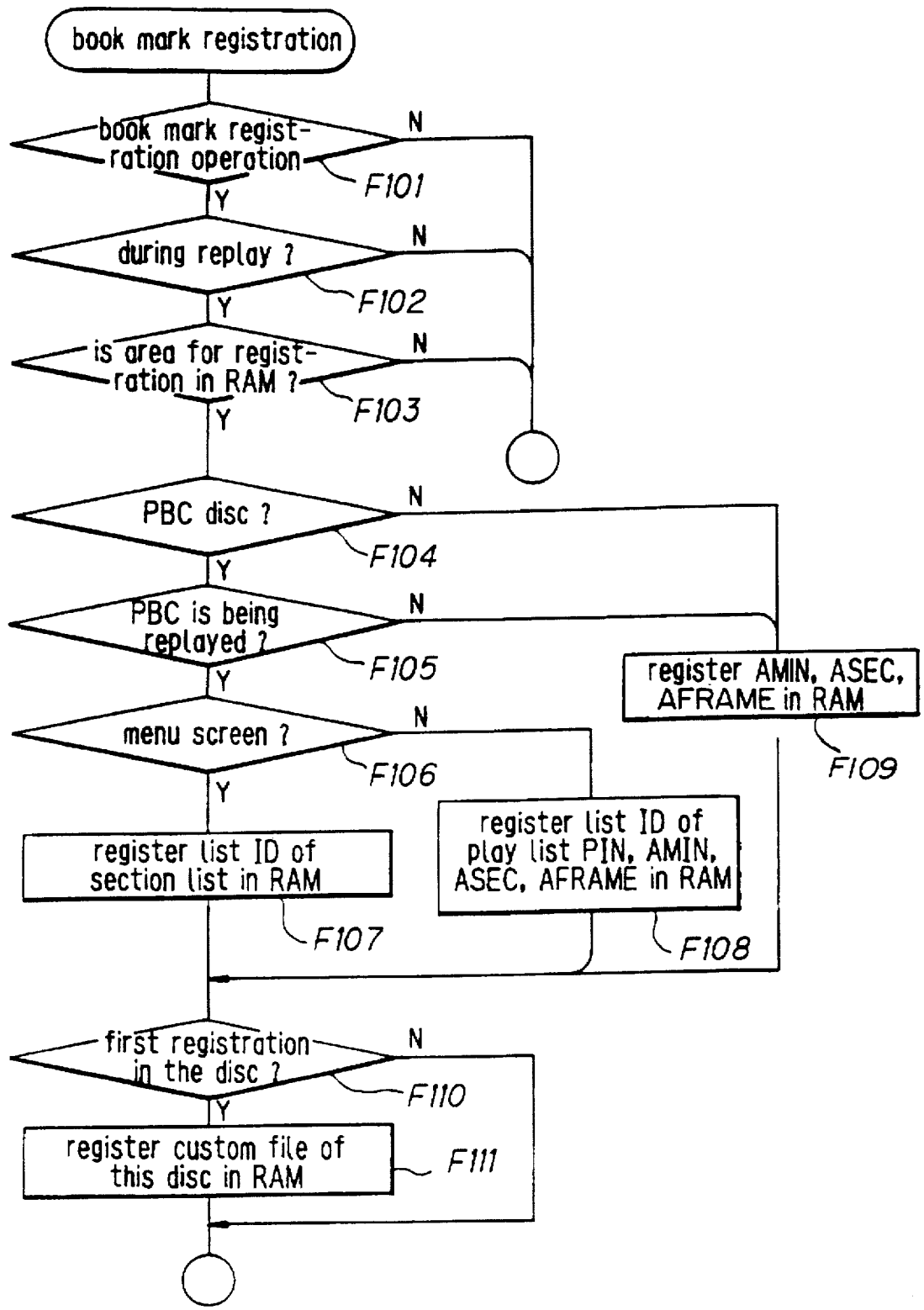
FIG. 28 is a flowchart showing the processing of registering a book mark in accordance with the embodiment.

The operation of registering the book mark in accordance with this embodiment is shown in FIG. 28.

Upon the activation of a book mark registration key 22 (F101), it is first determined whether the disc is being currently replayed or not (F102). If the disc is not being replayed, the operation of the book mark registration key 22 becomes invalid. A method of discriminating whether the disc is being replayed or not may include: a method of executing the discrimination on the basis of the output level of the RF signal being 0 level or not, using the output level of an RF signal outputted from the RF amplifier 36, a method of monitoring whether the replay key 5 of the operating unit 56 has been activated or not through the controller 53, and so on. It goes without saying that another method may be applied by which it is discriminated whether the disc is being replayed or not.

If the book mark registration key 22 is depressed during the replay operation, it is determined whether the memory 54 has a sufficient memory capacity for registration, or not (F103). In this embodiment, five book marks of book marks BM1 to BM5 can be registered per one disc. For that reason, the controller 53 may establish that the operation of the book mark registration key 22 is invalid because of in sufficient registration capacity if 5 book marks BM1 to BM5 have already been registered in the memory 54 in correspondence with the disc discrimination data of a disc which is being replayed. Also, even though 5 book marks have not been registered, if the book marks have been registered such that the entire memory capacity has been used for the data registered no new registration can be made. For this reason, similarly, the controller 53 may establish that the operation of the book mark register key 22 is invalid because of in sufficient registration capacity.

If there is a sufficient registration capacity, it is first confirmed whether the disc is a PBC disc having a playback control function, that is, a disc with a menu, or not (F104). If the disc is the PBC disc, it is further determined whether the present replay operation is a due to the playback control function, or not. The replay operation due to the playback control function is using the foregoing selection list and play list. Even if the disc is the PBC disc, the replay may be executed sequentially from the track #2 without using the playback control function, or the random replay or program replay can be performed. However, in this case, the negative result is obtained in Step F105.

When the affirmative result is obtained in Step F105, i.e., in the case of the replay operation using the playback control function, it is determined whether the present replay operation is a menu video replay or not (F106). In other words, it is determined whether the present replay operation is instructed by the selection list or the play list.

If the present replay operation is instructed by the selection list the operation proceeds to Step F107.

The list ID of the selection list is stored as book mark registration data in the memory 54.

If it is determined that it is not a menu replay state in Step F106, i.e., a certain replay item is replayed in accordance with the present play item, the operation proceeds to Step F108. Then, the list ID of the play list, a PIN of the play item Nos. (PIN) designated in that play list, which is now being replayed, and the absolute time addresses of the present replay point, AMIN, ASEC and AFRAME are stored as book mark registration data in the memory 54.

Furthermore, in the case where the disc is the CD-DA or video CD with no menu and it is determined that the disc is not a PBC disc in Step F104, and in the case where the disc is the PBC disc, but it is determined that the replay operation is not due to the playback control function in Step F105, the operation proceeds to Step F109.

In those cases, either the selection list and play list have not been recorded on the disc, or the selection list and play list have been recorded on the disc, but such lists are not operative.

For that reason, the absolute time addresses AMIN, ASEC and AFRAME of the present replay point are stored as book mark registration data in the memory 54.

Therefore, in the case where the book mark registration has been made on the disc once or more, the disc discrimination data of this disc has also been registered. In such a case, the storage of the book mark registration data in any one of Steps F107, F108 and F109 in associated with the disc discrimination data.

However, in the case where a book mark is registered in that disc for the first time, which disc the book mark registration data, executed in any one of Steps F107, F108 and F109, corresponds must be stored. In this situation, the operation proceeds from Step F110 to F111 where the disc discrimination data is registered in the, memory 54. In other words, the disc discrimination data is stored in the memory 54 in association with the book mark registration data executed in any one of Steps F107, F108 and F109.

With the foregoing processing, the registration of the book mark is executed in the memory 54.

3. Book Mark Replay Operation

Subsequently, the operation of replaying the book mark using the book mark registration data registered in the above-mentioned manner will be described.

Figure 29:
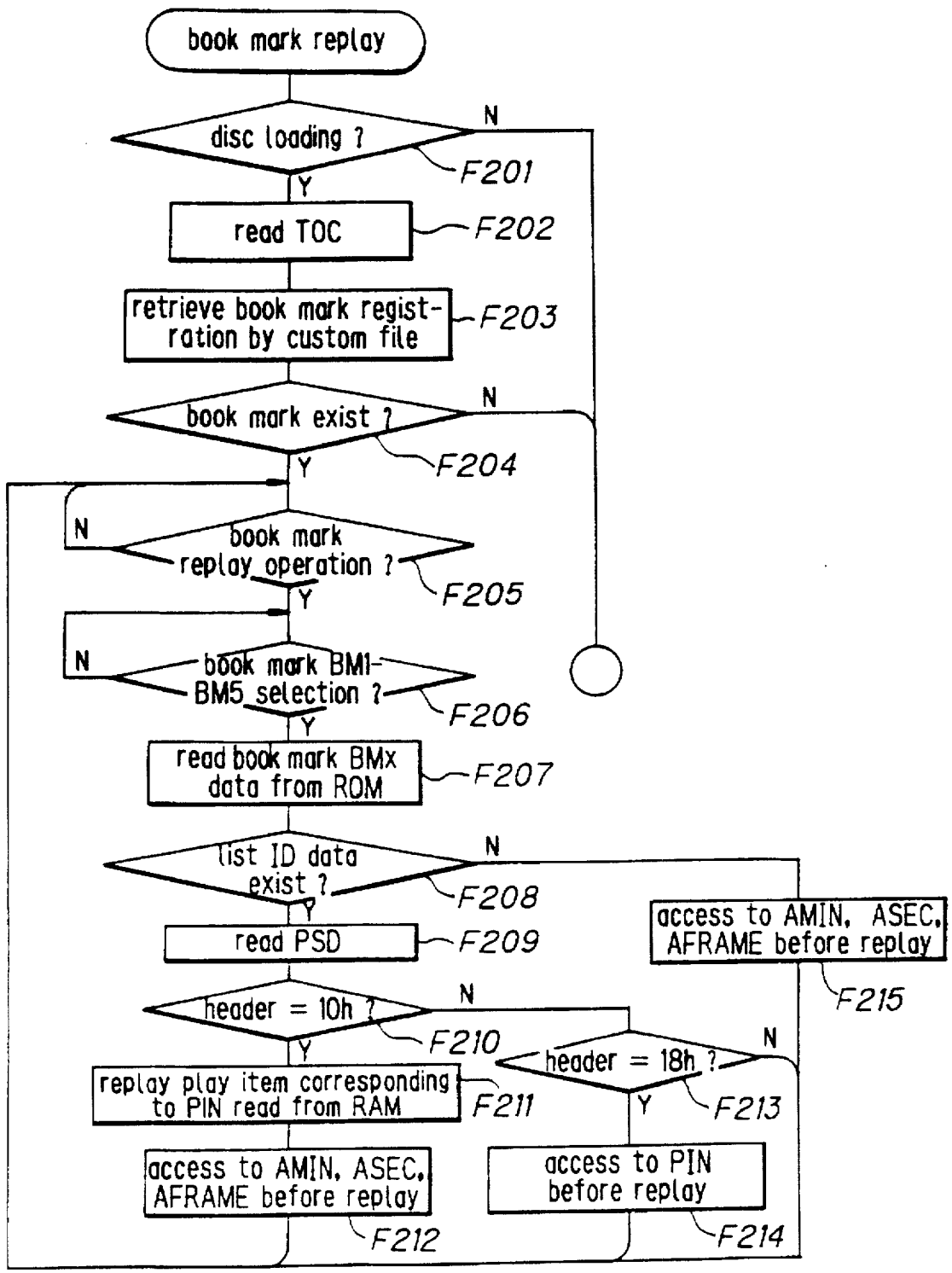
FIG. 29 is a flowchart showing the processing of replaying the book mark in accordance with the embodiment.

FIG. 29 is a flowchart showing the processing of the system controller 53 for the book mark replay operation.

After a certain disc on the rotary table 30a of the disc tray 30 is loaded, i.e., is disposed opposite the optical head 34 and the chucking operation is completed (F201), the TOC data is read in as described above (F202). The disc discrimination operation shown in FIG. 27 and the operation of producing the disc discrimination data are also executed at this time.

The data stored in the memory 54 is retrieved through the produced disc determined data, and it is discriminated whether the book mark registration has been conducted in the loaded disc, or not (F203). If the book mark registration has not been conducted in the loaded disc, because the replay of the book mark is not executed, the processing of the book mark replay is exited from Step F204. In the case where the book mark of the loaded disc has been registered, the operation proceeds to Step F205, resulting in a standby state of the book mark replay operation.

Figure 25:
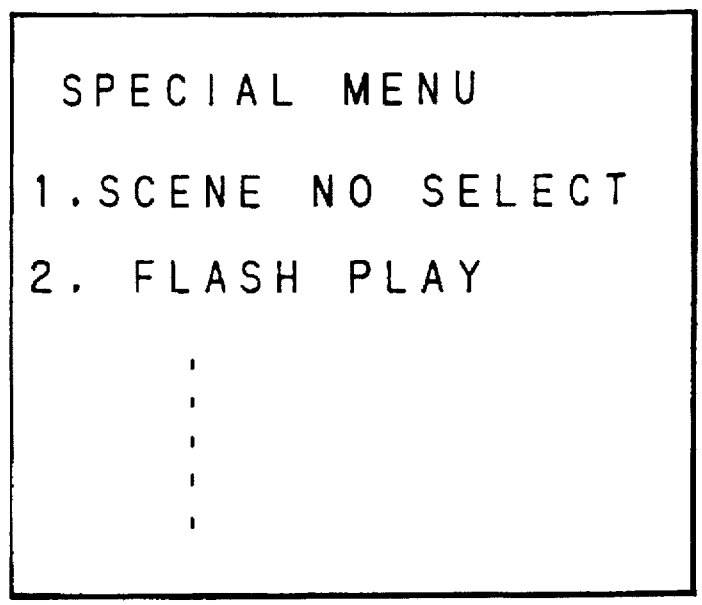
FIG. 25 is an explanatory diagram showing an example of a display in the case of allowing a book mark playback operation to be selected in accordance with the embodiment.

If the standby period of the book mark replay operation is not on replay, the system controller 53 generates a video output shown in FIG. 25, for example, from an internal ROM, and taken in the video RAM 43 so that the video output is displayed on the monitor unit. Alternatively, the OSD processor 50 is so controlled that the contents shown in FIG. 25 are displayed on the display unit through the superimposing operation.

In this example, [SCENE NO SELECT] is directed to a book mark point, and when the user selects the selection element from the screen shown in FIG. 25, this results in a book mark replay operation.

Also, even in the case where the disc is being replayed or stopped, it is changed over to the book mark replay state by depressing the book mark replay key 23.

Figure 26:
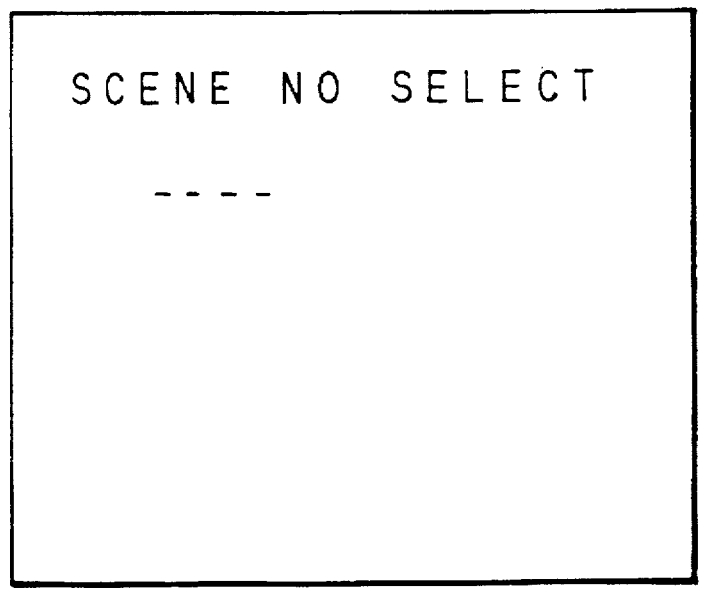
FIG. 26 is an explanatory diagram showing an example of a display for accelerating the selection of the book mark number to be replayed in accordance with the embodiment.

After the book mark replay operation has been conducted, it is determined which book mark point of the book marks BM1 to BM5 has been designated (F206). In this situation, a display for calling attention to the designation of a book mark point, as shown in FIG. 26, is conducted on the monitor unit. If the book mark registration is in only one place of this book mark BM1, the processing may be omitted.

It is assumed that the user designates, for example, the book mark BM3. Then, the system controller 53 reads out from the memory 54 the book mark registration data corresponding to the book mark BM3 which has been stored in association with the disc discrimination data of the disc (F207). Then, it is determined whether the list ID data is contained in the book mark registration data or not (F208).

If the list ID data is contained therein, data of PSD (play sequence descriptor) is read in from the list ID data, and it is determined whether the PSD corresponding to the registered list ID data is a play list or a selection list, in accordance with a value of its list header (F209, F210, F213).

If PSD list header=[10h], the book mark registration has been conducted during the replay operation where a certain play list functions in the playback control function. Then, the operation is shifted to the playback control operation from the registered PIN play item in that play list (F211).

For that reason, the optical head 34 accesses the sectors of the absolute time addresses AMIN, ASEC and AFRAME indicated in the book mark registration data, thereby starting the replay (F212).

As a result, the replay operation is executed from the point at which the book mark has been registered before by the user. Because it is a replay operation based on the registered play list, the replay operation is the same as in the case in which the lists are normally pursued in accordance with the playback control operation. In other words, the play list at that point can be shifted to a predetermined list by the previous operation, the next operation and the return operation.

On the other hand, if it is determined that PSD list header=[18h] in Step F213, the book mark registration has been conducted during the replay operation where a certain selection list functions in the playback control function. Therefore, it is shifted to the replay operation using the selection list (F214). In other words, a predetermined segment play item is replayed as the play item of the PIN recorded in the selection item, thereby executing the menu display.

As a result, the replay operation is executed from the menu point at which the book mark has been registered before by the user. Because it is a replay operation based on the registered play list, the replay operation is the same as at the point of normally replaying a certain menu in the playback control operation. In other words, the operation proceeds to a list designated by the selection list in accordance with the selection operation for the menu video, thereby executing the replay operation. The selection list at that point can be shifted to a predetermined list by the previous operation, the next operation and the return operation.

In the case where no list ID exists in the book mark registration data in Step F208, the registration has been conducted during the replay operation where the playback control function has not been executed, or a disc which is now being loaded is a CD-DA or a video CD having no playback control function.

In this case, the optical head 34 accesses the sectors of the absolute time addresses AMIN, ASEC and AFRAME indicated in the book mark registration data, thereby starting the replay (F215).

With the foregoing processing, if the user conducts the book mark replay operation, the replay can be executed from a desired point at which the book mark registration has been conducted as was described with reference to FIG. 24. For that reason, in the case where the user wants to repeatedly watch the replay from a certain replay point through the playback control function, with the registration of that point as a book mark, the replay can be thereafter conducted immediately without pursuing the list structure, resulting in a user convenience.

Further, in the case where another business occurs before a sequence of replay operation due to the playback control function is completed, if that point is registered as a book mark, the replay can be executed instantly from that point the next time. Thus, because the menu selection to reach this point becomes unnecessary, the present invention is suitable also to such a case.

Because the present invention can cope with a disc having no playback control function as described above, the user can conduct the registration of the book mark in accordance with the respective circumstances without considering the type of the various discs. With this function, the operability is remarkably improved.

As was described above, it goes without saying that a variety of modified examples of the present invention are considered.

For example, the above-mentioned embodiment is so designed that a custom file is used for the disc discrimination data in the book mark registration. However, in the case of a video CD, a disc ID has been recorded within disc information as shown in FIG. 14, and this may be used as disc discrimination data.

Also, in the case where some points of book marks can be attached to a single disc, the i-picture and the still picture at the replay point of the respective marks are reduced, respectively, so that they are displayed on one screen together during the replay operation of the book mark, thereby being capable of better facilitating the operability of the selection.

Further, in the foregoing description, the replay apparatus of the present invention has a changer function. However, the present invention can be applied even to a replay apparatus capable of accommodating a single disc.

Still further, the recording medium is not limited to a disc-shaped recording medium as in the foregoing embodiment, but may be of a tape-shaped recording medium.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A reproducing apparatus for reproducing audio and video data from any predetermined position on a recording medium having recorded thereon compressed audio and video data and playback control data which is operable to provide a user interactive operation on said audio and video data, said reproducing apparatus comprising:

reproducing means for reproducing said one of said compressed audio and video data from said recording medium;

input means for specifying a replay start position indicating a bookmark address on said recording medium;

memory means for storing at least one of said bookmark address and playback control data providing a substantially immediate access to said replay start position;

discrimination means for determining whether said playback control data has been recorded on said recording medium prior to the current replay of said audio and video data; and control means for controlling said memory means to store only said bookmark address if said playback control data has not been recorded on said recording medium, said control means controlling said memory means to store at least said playback control data if said playback control data has been recorded on said recording medium.

2. The apparatus according to claim 1, wherein said playback control data includes a list identification for a selection list which includes a menu and for a play list which includes at least one play item.

3. The apparatus according to claim 2, further comprising second discrimination means for determining based on said playback control data whether said video and audio data is reproduced as one of said selection list and said play item of said play list in response to a user request.

4. The apparatus according to claim 3, wherein said memory means stores only said list identification if said selection list is reproduced.

5. The apparatus according to claim 3, wherein said memory means stores said list identification and said bookmark address if said play item is reproduced.

6. The apparatus according to claim 2, further comprising means for determining based on said playback control data whether said bookmark is set in said menu or in said play item.

7. The apparatus according to claim 6, wherein said memory means stores only said list identification if said bookmark is set in said menu, said memory means additionally storing said bookmark address if said bookmark is set in said play item.

8. The apparatus according to claim 2, wherein prior to storing said bookmark address said control means determines whether said memory means has sufficient capacity for additional data storage.

9. A method for reproducing audio and video data from any predetermined position on a recording medium having recorded thereon compressed audio and video data and playback control data which is operable to provide a user interactive operation on said audio and video data, said method comprising the steps of:

reproducing said one of said compressed audio and video data from said recording medium;

specifying a replay start position indicating a bookmark address on said recording medium;

storing at least one of said bookmark address and playback control data providing a substantially immediate access to said replay start position;

determining whether said playback control data has been recorded on said recording medium prior to the current replay of said audio and video data; and controlling the storage of only said bookmark address if said playback control data has not been recorded on said recording medium, and controlling the storage of at least said playback control data if said playback control data has been recorded on said recording medium.

10. The method according to claim 9, wherein said playback control data includes a list identification for a selection list which includes a menu and for a play list which includes at least one play item.

11. The method according to claim 10, further comprising determining based on said playback control data whether said video and audio data is reproduced as one of said selection list and said play item of said play list in response to a user request.

12. The method according to claim 11, wherein only said list identification is stored if said selection list is reproduced.

13. The method according to claim 11, wherein said list identification and said bookmark address are stored if said play item is reproduced.

* * * * *